United States Patent
Lee et al.

(10) Patent No.: US 7,139,044 B2
(45) Date of Patent: Nov. 21, 2006

(54) THIN FILM TRANSISTOR ARRAY PANEL

(75) Inventors: Joo-Hyung Lee, Seoul (KR); Dong-Gyu Kim, Kyungki-do (KR); Woon-Yong Park, Kyungki-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/465,883

(22) Filed: Jun. 20, 2003

(65) Prior Publication Data
US 2003/0210359 A1 Nov. 13, 2003

Related U.S. Application Data

(62) Division of application No. 09/172,130, filed on Oct. 14, 1998, now Pat. No. 6,587,160.

(30) Foreign Application Priority Data

| Oct. 14, 1997 | (KR) | 97-52480 |
| Jan. 21, 1998 | (KR) | 98-1699 |
| Jun. 5, 1998 | (KR) | 98-20793 |
| Sep. 15, 1998 | (KR) | 98-37940 |

(51) Int. Cl.
G02F 1/1333 (2006.01)
G02F 1/136 (2006.01)

(52) U.S. Cl. ....................................................... 349/40

(58) Field of Classification Search ........... 349/54–55, 349/192, 149, 40–43
See application file for complete search history.

(56) References Cited

U.S. PATENT DOCUMENTS

| 5,068,748 A | 11/1991 | Ukai et al. .................... 349/38 |
| 5,233,448 A | 8/1993 | Wu .............................. 349/38 |
| 5,521,728 A | 5/1996 | Kodate et al. ................. 349/42 |
| 5,606,340 A | 2/1997 | Suzuki et al. ................. 349/42 |
| 5,926,234 A | 7/1999 | Shiraki et al. ................ 349/40 |
| 5,936,687 A * | 8/1999 | Lee ............................. 349/40 |
| 5,946,057 A | 8/1999 | Kusanagi ..................... 349/40 |
| 6,043,971 A | 3/2000 | Song et al. ................... 349/40 |
| 6,072,550 A | 6/2000 | Kim ............................ 349/40 |
| 6,337,722 B1 * | 1/2002 | Ha .............................. 349/40 |

FOREIGN PATENT DOCUMENTS

| JP | 05-142578 | 6/1993 |
| JP | 09-288284 | 11/1997 |
| JP | 11-271722 | 10/1999 |

\* cited by examiner

*Primary Examiner*—Dung T. Nguyen
(74) *Attorney, Agent, or Firm*—MacPherson Kwok Che & Heid LLP; John F. O'Rourke

(57) ABSTRACT

A data line and an amorphous silicon pattern are formed on a substrate. The first electrode pattern is extended from the data line and overlaps an edge of the amorphous silicon pattern. The second electrode pattern is made of the same metal as the first electrode pattern and overlaps the edge of the amorphous silicon pattern at an opposite side of the first electrode pattern. Edges of the first and the second electrode patterns are sharply formed so that a tunneling effect easily occurs through the amorphous silicon pattern. An indium-tin-oxide pattern for a capacitor is formed at the end of the second electrode pattern. The capacitor is formed between the ITO pattern and a common electrode.

5 Claims, 28 Drawing Sheets

THIN FILM TRANSISTOR ARRAY PANEL

This application is a divisional of U.S. patent application Ser. No. 09/172,130 filed on Oct. 14, 1998, which will become U.S. Pat. No. 6,587,160.

BACKGROUND OF THE INVENTION (a) Field of the Invention

The present invention relates to liquid crystal displays (referred to as an LCD hereinafter) and manufacturing methods thereof, and more particularly, to electrostatic discharge prevention circuits for LCDs and manufacturing methods thereof.

(b) Description of the Related Art

A liquid crystal display (LCD), which is one type of flat panel display (FPD), includes two substrates having transparent electrodes and a liquid crystal layer interposed between the substrates. In the LCD, light transmittance is controlled by varying the voltages applied to the liquid crystal layer.

On a thin film transistor (TFT) substrate of the LCD, N gate lines and M data lines, cross one another and define a plurality of pixels in an N×M matrix. A pixel electrode is formed for each pixel, and is coupled to the gate and the data lines by a switching device such as the TFT. The TFT controls display signals transmitted through the data line according to the states of the scanning signals transmitted through the gate line.

The majority of the LCD manufacturing process is performed on a glass substrate. Since the glass substrate in nonconductive, electric charges generated suddenly cannot be dispersed. Such an electrostatic charge may damage the insulating films or TFTs.

In the LCD manufacturing process, the high voltage electrostatic charges generated after the assembly of the TFT substrate and a cooler filter substrate may decrease the substrate quality, even though the charge amount is small. Also, the electrostatic charge generated during the cutting step of the substrate flows into the active area of the pixel regions through gate and data pads and damages the channels of the TFTs near the pads.

FIG. 1 shows a layout view of the conventional LCD substrate which is damaged by an electrostatic discharge. As shown in the drawing, the LCD panel includes a TFT substrate 10 and a cooler filter substrate 20. A pad area 30, in which pads are formed to connect each wire of the TFT substrate 10 to driving circuits, and an active area 40, where actual images are displayed, are separately formed of the TFT substrate 10.

Lines 50 in the active area 40 illustrate pixels of TFTs damaged by electrostatic charges. If electrostatic charges are generated in the pad area 30 and propagate into the active area 40, the channels of the TFTs next to the pads are damaged and the channel quality is deteriorated.

The deteriorated TFT is shown in FIG. 2. As shown in the drawing, a gate line 60 and a data line 80 cross each other. An edge of a gate electrode 61, extended from the gate line 60, overlaps an end of a source electrode 81 which is extended from the data line 80. An edge of the gate electrode 61, opposite the edge overlapping with the source electrode 81, overlaps with a drain electrode 82. A semiconductor film 70 is formed on the overlapping portion of the gate electrode 61, source electrode 81 and drain electrode 82.

The electrostatic charges entering into the TFT will be discharged with sparks between the source electrode 81 and the drain electrode 82, thereby damaging the semiconductor film 70.

To reduce the damage caused by electrostatic discharges, a shorting bar is typically used to disperse the electrostatic charges. The shorting bar is located at the edge of the substrate and connects all the metal wires. However, the shorting bar alone cannot prevent damage caused by a large the electrostatic discharge. Moreover, electrostatic charges cannot be prevented from entering into the substrate after the shorting bar is removed.

In manufacturing the LCD panel, a polarizer is attached after performing a visual display test by applying signals to the shorting bar. Then, the mother substrate is cut into individual LCD substrates, liquid crystal is injected between the substrates, and the injection holes are sealed. The shorting bar is removed as the substrate is cut. In another visual display test, different test signals are applied to adjacent data lines via corresponding parts by probes and driving circuits are attached to the LCD panel.

As mentioned above, since the shorting bar is removed as the substrate is cut, it is difficult to protect the substrate against the electrostatic charges subsequent to the removal of the shorting bar. Moreover, since the polarizers are attached after the simple test, in which only one signal is applied to every wire, by using the shorting bar, the polarizers will be evenly attached to the damaged LCD panel. If a panel is determined to be damaged in a subsequent test, it has to be discarded along with the polarizers, thereby increasing overall manufacturing costs of the LCD.

SUMMARY OF THE INVENTION

It is an object of the present invention to provide a liquid crystal display having a substrate that is safe from electrostatic charges, regardless of the strength thereof.

It is another object of the present invention to provide a liquid crystal display that prevents electrostatic charges from entering into the substrate after a shorting bar is removed, thereby minimizing pixel defects.

It is yet another object of the present invention to provide a method for manufacturing a liquid crystal display that prevents an LCD panel being damaged by an electrostatic discharge, while reducing the manufacturing cost of the LCD.

The present invention provides a LCD with a plurality of spark inducing circuits. The spark inducing circuits dissipate electrostatic charges generated in wires of a TFT substrate. A plurality of electrostatic charging circuits that dissipate the electrostatic charges by storing them.

The spark inducing circuit includes a plurality of the TFTs, connected in series between two adjacent wires and gate electrodes of which are connected to that of the other; and two capacitors, one electrode of which is connected to the gate electrode of the TFTs and the other electrode of which is connected to the adjacent wire. Since a plurality of the spark inducing circuits are connected in parallel between the adjacent wires, if electrostatic charges generate in the wires, sparks occur in the TFTs of the spark inducing circuits, which induces a strong current between the source and the drain electrode of the TFTs. This surge current transforms into joule heat, thereby losing its strength. Therefore, the TFTs in an active area are protected from the electrostatic discharge. The electrostatic charges generated in a wire also disperses to the adjacent wires. The spark inducing circuit formed by connecting a TFT and a capacitor in series between each wire and a common electrode.

In another aspect, the spark inducing circuit may be formed with a TFT, whose gate electrode and drain electrode are respectively connected to the same wire, and source electrode is connected to a dummy line; and a capacitor formed between the wire and the drain electrode.

A circuit for dispensing electrostatic charges comprises a resistor and a capacitor connected in series between a data line and a dummy gate line and another resistor connected between an adjacent data line and the capacitor to replace the spark inducing circuit.

The electrostatic charging circuit comprises a first electrostatic charging circuit, which is formed outside a sealing material that assembles the TFT substrate and the corresponding substrate and a second electrostatic charging circuit, which is formed inside a sealing material. The first electrostatic charging circuit has two capacitors connected in series to each other between two adjacent wires. A number of the first electrostatic charging circuits may be connected in parallel to the adjacent wires. The second electrostatic charging circuit, which prevents electrostatic charges from entering the active area, comprises capacitors formed between each wire and a common electrode. The capacitor includes wires and an additional corresponding electrode coupling to the common electrode. The corresponding electrode over the gate line is made of a metal used for forming the data line, and the corresponding electrode over the data line is made of a metal used for forming the gate line. The first and the second electrostatic charging circuits remove the electrostatic charges generated in the wires by storing them.

To protect the TFT substrate from electrostatic charges, a shorting bar, which links all the wires formed on the TFT substrate, is formed inside a cutting line of the substrate. Since the shorting bar remains on the substrate even after the TFT substrate is divided into a plurality LCD panels, it is still possible for the TFT substrate to be protected by the shorting bar.

To protect the LCD from electrostatic charges occurring in the manufacturing process, an electrostatic discharge protection circuit, a TFT and wires are formed on a substrate. A shorting bar is formed inside the cutting line of the substrate, and the substrate is cut into several TFT substrates. Next, individual LCD panels are assembled and the shorting bar is removed by edge-grinding. After visual display tests by applying test signals to each of the wires, polarizers are attached on the LCD panel of no defect. Driving circuits are then connected to the LCD panels.

In the manufacturing method of the current invention, the LCD panel is protected against electrostatic charges since the cutting step, injection of the liquid crystal and the sealing of an injection hole are all performed while the shorting bar remains on the LCD panel. Moreover, it is possible to reduce the manufacturing cost since polarizers are attached on the good LCD panels only.

In another embodiment of the present invention, dummy lines are laid outside an active area that forms a plurality of dummy pixels by intersecting gate lines and data lines. A dummy TFT connecting the dummy line is formed for each dummy pixel.

In the above, the width to length ratio of the dummy TFT channel is higher than that of the TFT channel formed in the active area, or more than one dummy TFTs are formed for one dummy pixel. Accordingly, electrostatic charges are dispersed through the dummy TFT when generated.

A dummy pixel electrode, which is connected to the TFT, is formed in the dummy pixel, and a black matrix to cover the dummy pixel is formed on one of the two substrates.

Generally, electrostatic charges that generate at the beginning or at the end of each step pass through dummy gate lines and dummy data lines of the dummy pixels surrounding the active area and deteriorate the dummy TFT first. Therefore, the TFTs of the active area connected to the gate and the data line, are protected against electrostatic charges. Here, damaged dummy pixels do not affect the LCD quality.

The shape of the dummy TFT may vary to effectively induce electrostatic charges. It is preferable that the width to length ratio of the dummy TFT channel is higher than that of the TFT in the active area. A plurality of dummy TFTs may be formed in the dummy pixel.

Meanwhile, an electrostatic charge dispersing pattern, consisting of two electrodes and a semiconductor pattern, is formed outside an active area to dissipate electrostatic charges through the channel of the semiconductor pattern. To effectively discharge electrostatic charges, the ends of the electrodes may be pointedly formed and a capacitor is formed at the end of the semiconductor pattern. A plurality of the discharge patterns may be connected in parallel to one or two wires.

DETAILED DESCRIPTION OF THE PREFERRED EMBODIMENTS

Figure 1:
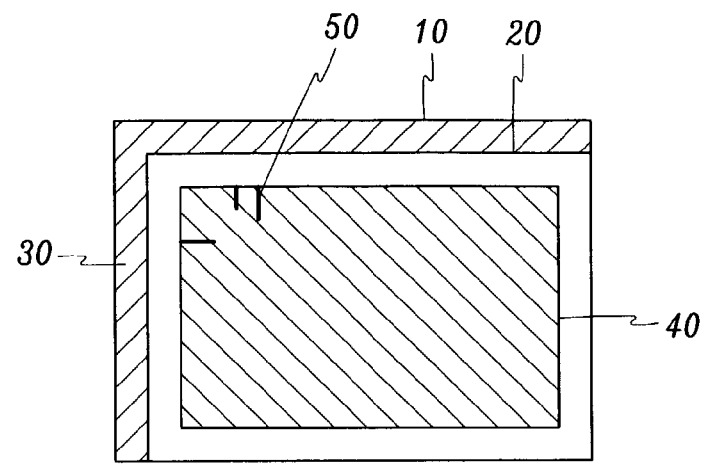
FIG. 1 is a layout view of a conventional liquid crystal display (LCD) damaged by an electrostatic discharge.
Figure 2:
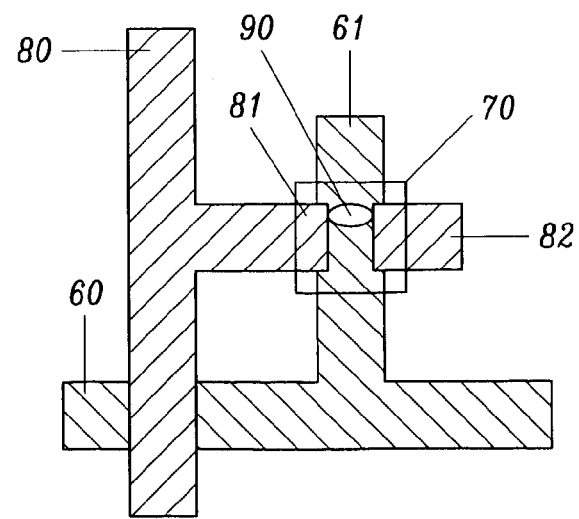
FIG. 2 is an enlarged layout view of the thin film transistor in FIG. 1.

The present invention now will be described more fully hereinafter with reference to the accompanying drawings, in which preferred embodiments of the invention are shown. This invention may, however, be embodied in many different forms and should not be construed as limited to the embodiments set forth herein. In the drawings, the thickness of layers and regions are exaggerated for clarity. Like numbers refer to like elements throughout. It will be understood that when an element such as a layer, region or substrate is referred to as being "on" another element, it can be directly on the other element or intervening elements may also be present.

Figure 3:
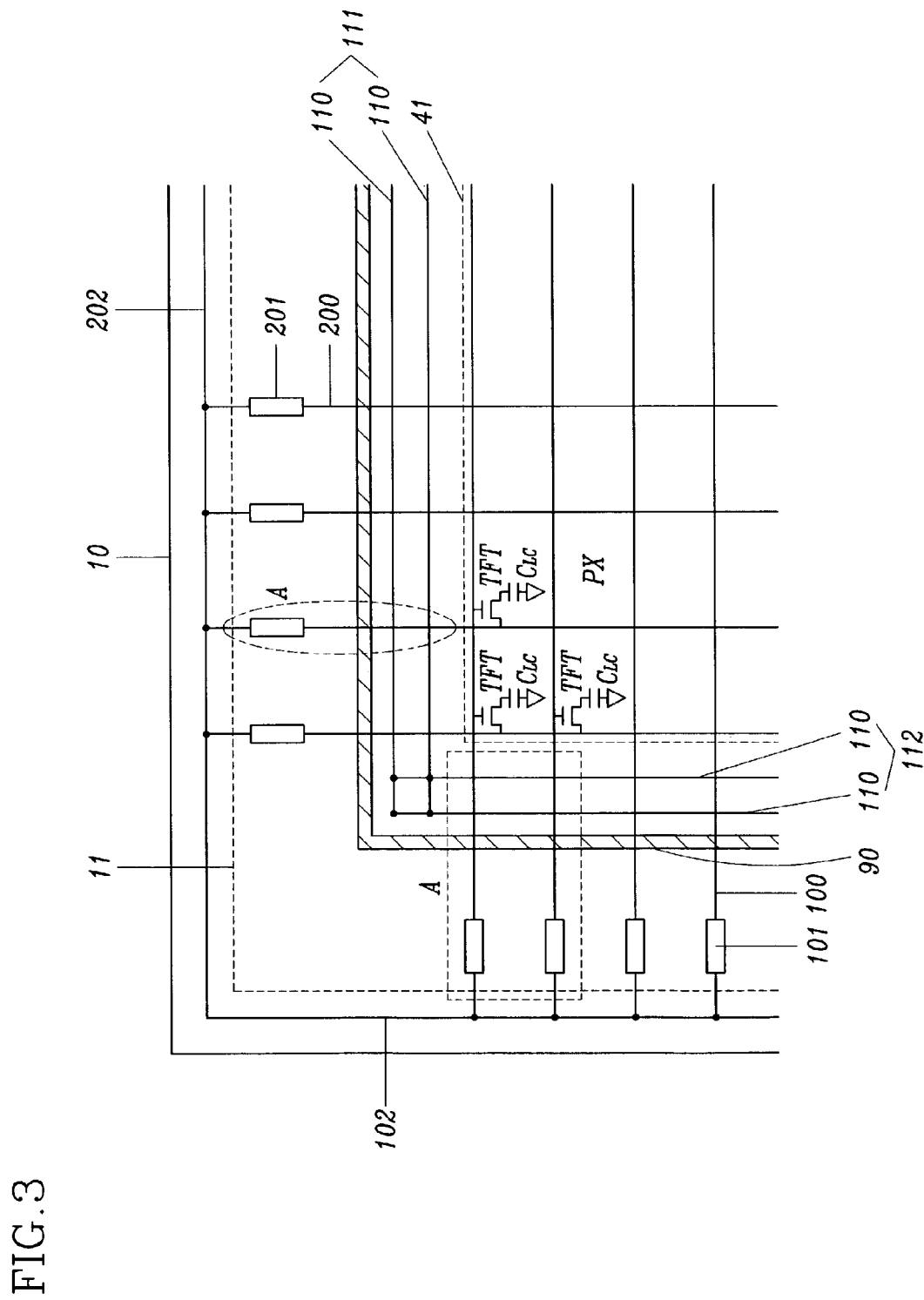
FIG. 3 is a schematic diagram of an LCD substrate according to a preferred embodiment of the present invention.

FIG. 3 shows a schematic diagram of a liquid crystal display substrate according to a preferred embodiment of the present invention. As shown in FIG. 3, a plurality of gate lines 100 are formed on a transparent insulating substrate 10 in a horizontal direction, and gate pads 101 are formed at the ends of respective gate lines 100. A plurality of data lines 200 are formed in a vertical direction to cross the gate lines 100, and data pads 201 are formed at the ends of respective data lines 200. Thin film transistors (TFTs), which are switching devices, are formed in respective pixel regions PXs defined by intersections of the gate lines 100 and data lines 200. A plurality of the pixel regions Px build an active area, confined by an active area line 41, where the visual image is displayed.

Shorting bars 102 and 202, which respectively link all the gate lines 100 and all the data lines 200 at the ends thereof, are formed near the edges of the substrate 10. The shorting bars 102 and 202 are interconnected such that the gate and the data lines 100 and 200 are electrically connected. As a result, if electrostatic charges are generated in the gate and data pads 101 and 201, the electrostatic charges and dispersed through the shorting bars 102 and 202.

Nonetheless, a large amount of electrostatic charges may enter the active area, even though the shorting bars 102 and 202 are provided as described above. Furthermore, if electrostatic charges are generated after the shorting bars 102 and 202 are removed along the cutting line 11, the electrostatic charges easily enter the active area. In order to effectively disperse the electrostatic charges, electrostatic charge dispersing circuits, which are connected to a guard ring or a dummy line 110 surrounding the active area, are laid on the area A of the substrate 10, i.e., between the pads of either 101 or 201 and the active area.

Meanwhile, the shorting bars 102 and 202 may be located inside a cutting line 11 of the substrate.

Figure 4:
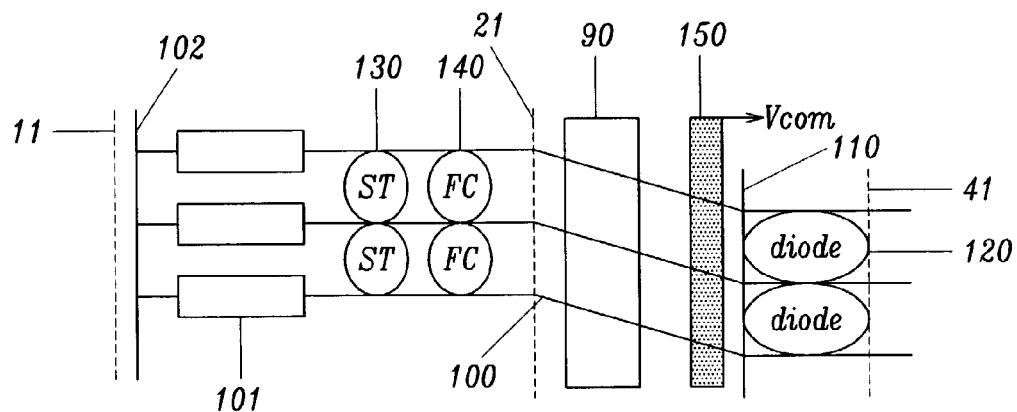
FIG. 4 is an enlarged layout view of A in FIG. 3 according to a first preferred embodiment of the present invention.

FIG. 4 shows an enlarged view of the area A in FIG. 3. In FIG. 4, the cutting line 11, along which the substrate 10 is cut to remove the shorting bar 102, a boundary line 21 which corresponds to another substrate 20 opposite the substrate 10, and the active area line 41 are shown by dotted lines. The shorting bar 102 is located inside the cutting line 11, the pads 101 connected to the shorting bar 102 are located between the cutting line 11 and the boundary line 21, and wires 100 extend from the pads 101 toward the active area. A seal 90 combining two substrates is located between the boundary line 21 and the active area line 41. The guard ring or dummy line 110, made of metal, is placed between the seal 90 and the active area line 41. Electrostatic discharge protection circuits, such as diode circuits 120, spark inducing circuits or electrostatic charging circuits are connected to the wires 100 and the dummy line 110.

Figure 5:
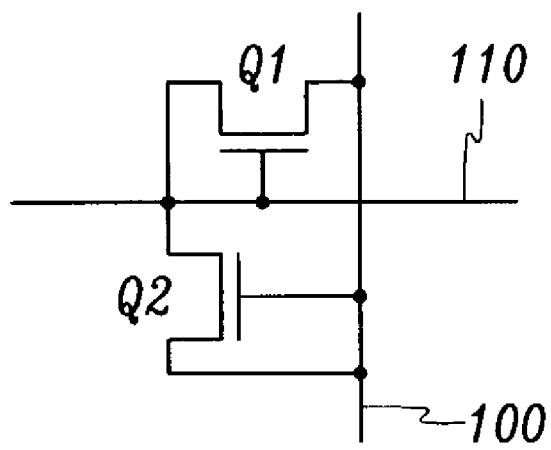
FIG. 5 illustrates a schematic diagram of an electrostatic discharge protection diode circuit shown in FIG. 4.

Now, the electrostatic discharge protection diode circuits 120 are described with reference to FIG. 5.

A gate electrode and a drain electrode of a TFT Q1 are connected to the dummy line 110, and a source electrode is connected to the wire 100. There is provided another TFT Q2 having a gate electrode and a drain electrode connected to the wire 100, and a source electrode connected to the dummy line 110. Since the gate and the drain electrodes of the TFTs Q1 and Q2 are connected to each other, the TFTs Q1 and Q2 serves as diodes. As a result, the TFTs Q1 and Q2 are interconnected in a back-to-back mode between the dummy line 110 and the wire 100.

The TFTs Q1 and Q2 generally include an amorphous silicon of high resistivity, while the wire 100 is made of a material of low resistivity such as a metal. Therefore, the amount of electrostatic charges entering the dummy line 110 may be smaller than that entering the wire 100. As a result, it is difficult to completely protect the LCD substrate against the large amount of electrostatic charges only with the circuit shown in FIG. 5.

The spark inducing circuit and the electrostatic charging circuit may help the electrostatic discharge protection.

Spark inducing circuits 130 and first electrostatic charging circuits 140 of FIG. 4 are connected to the wires 100 between the seal 90 and the pads 101, and second electrostatic charging circuits 150 are connected to the wires 100 between the seal 90 and the active area 41, to effectively discharge the electrostatic charges.

However, the spark inducing circuits 130 and the electrostatic charging circuits 140 and 150 outside the seal 90 may be easily damaged by an exposure to air or by an external shock.

Figure 6:
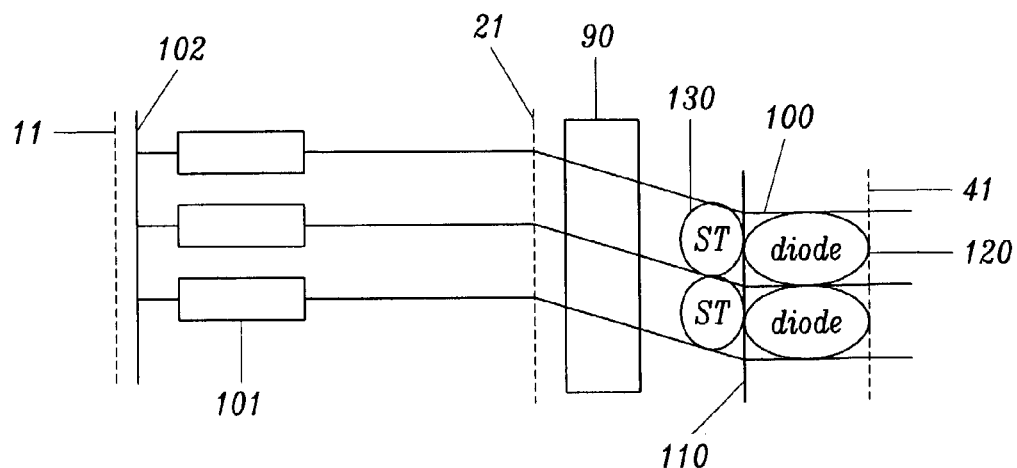
FIG. 6 is an enlarged layout view of A in FIG. 3 according to a second preferred embodiment of the present invention.

FIG. 6 is an enlarged view of the area A in FIG. 3 according to a second preferred embodiment of the present invention. In the second embodiment, electrostatic discharge protection circuits are located inside the seal 90.

As shown in FIG. 6, spark inducing circuits 130 are connected to wires 100 between the seal 90 and the active area line 41, and electrostatic discharge protection diodes 120 are connected to the wires 100 as in the previous embodiment. First and second electrostatic charging circuits (not shown) may be provided inside the area enclosed by the seal 90.

A various types of the spark inducing circuits 130 according to the preferred embodiments are shown in FIGS. 7 through 11. First through fourth spark inducing circuits ST1, ST2, ST3 and ST4 will be described with reference to FIGS. 7 through 10, respectively. The first through fourth spark inducing circuits ST1, ST2, ST3 and ST4 represents different types of spark inducing circuits.

Figure 7:
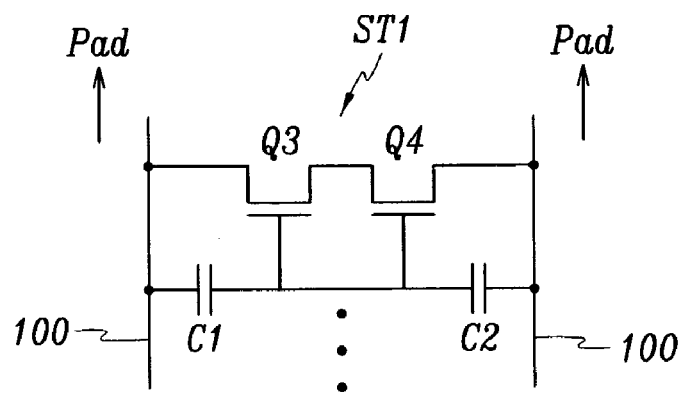
FIG. 7 is a schematic diagram of a first spark inducing circuit in FIGS. 4 and 6.

FIG. 7 illustrates the first spark inducing circuit ST1. As shown in the drawing, the first spark inducing circuit ST1 includes a pair of TFTs Q3 and Q4, which are connected between two adjacent wires 100 in series, and two capacitors C1 and C2. That is, gate electrodes of the TFTs Q3 and Q4 are connected to each other, a source or a drain electrode of one of the TFTs is connected to a source or a drain electrode of the other TFT, and electrodes of the capacitors C1 and C2 are respectively connected to one of the adjacent two wires 100 and to the gate electrodes of the TFTs Q3 and Q4. A plurality of the first spark inducing circuit ST1 are connected to the adjacent two wires 100 in parallel.

The operation of the first shock inducing circuit ST1 will be described hereinafter. Electrostatic charges generated from the pads 101 and entering into the first spark inducing circuit ST1 sparks in the TFTs of the first spark inducing circuit ST1 to extinguish the electrostatic charges. As a result, the TFTs in the active area are protected from the electrostatic charges. The electrostatic charges generated in the wires 100 are charged in the capacitors C1 and C2 to turn on the TFTs and dispersed throughout the whole wire 100.

In the first spark inducing circuit ST1, more than two TFTs connected between the wires 100 in series, may effectively reduce the current flowing through the wires 100.

Figure 8:
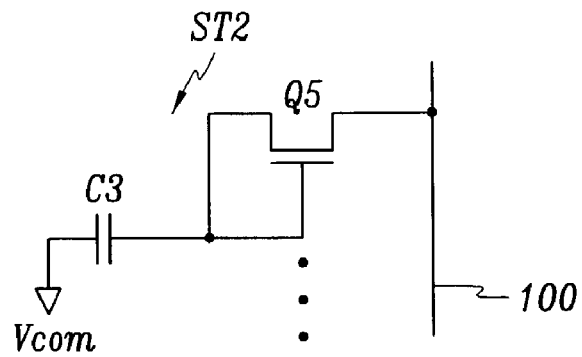
FIG. 8 is a schematic diagram of a second spark inducing circuit in FIGS. 4 and 6.

FIG. 8 shows the second spark inducing circuits ST2. As shown in the drawing, the second spark inducing circuit ST2 includes a TFT Q5 and a capacitor C3. A gate electrode and a drain electrode of the TFT Q5 are electrically connected to each other and a source electrode of the TFT Q5 is connected to the wire 100. The capacitor C3 is connected between the gate electrode and a common voltage. Vcom is also connected to a common electrode (not shown). A plurality of the second spark inducing circuits ST1 may be connected to each of the wires 100.

In this embodiment, the common electrode is used as a storage electrode, but a separate electrode may be used as a storage electrode.

Figure 9:
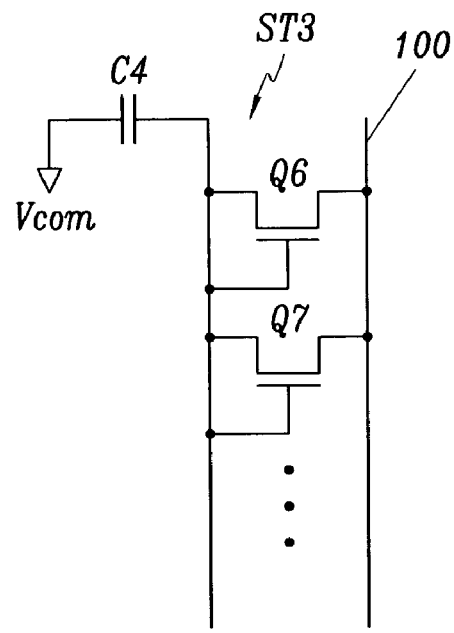
FIG. 9 is a schematic diagram of a third spark inducing circuit in FIGS. 4 and 6.

FIG. 9 shows the third spark inducing circuit ST3. As shown in the drawing, the structure of the third spark inducing circuit ST3 is substantially the same as the second spark inducing circuit ST2. However, the third spark including circuits ST3 and a plurality of TFTs Q6 and Q7 and only one capacitor C4. The gate electrodes and the drain electrodes of the TFTs Q6 and Q7 are connected to each other and to the capacitor C4, and the source electrodes of the TFTs Q6 and Q7 are connected to the wire 100. The operation of the third spark inducing circuit ST3 is almost the same as that of the second spark inducing circuit ST2.

Like the second spark inducing circuit, the common electrode is used as a storage electrode, but separate electrode may be used as a storage electrode.

The first through third spark inducing circuits ST1, ST2 and ST3 may be located inside the seal 90.

Figure 10:
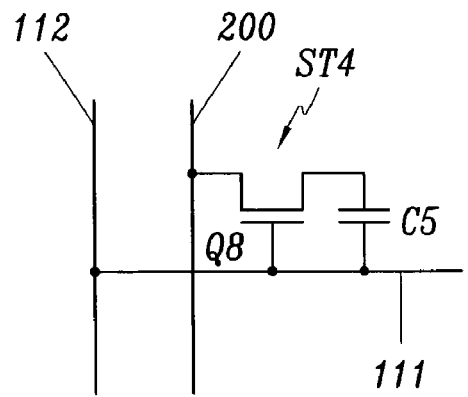
FIG. 10 is a schematic diagram of a fourth spark inducing circuit in FIGS. 4 and 6.

FIG. 10 shows the fourth spark inducing circuit ST4.

As shown in the drawing, it has dummy wires or a guard ring of a dummy gate line 111, a dummy data line 112 connected to the dummy gate line 111, and a TFT Q8 formed on the dummy gate line 111. A gate, a source and a drain electrodes of the TFT Q8 are connected to the dummy gate line 111, a data line 200, and an electrode of a capacitor C5 which has another electrode connected to the dummy gate line 111.

In the fourth spark inducing circuit ST4, electrostatic charges transmitted to the dummy gate line 111 charges the capacitor C5 and turns on the TFT Q8. The electrostatic charges generated from the dummy gate line 111 and from the dummy data line 112, are dispersed through the data line 200 and the dummy wires. A large amount of the electrostatic charges may spark and break down the TFT Q8, thereby extinguishing the electrostatic charges.

In the first through fourth spark inducing circuits ST1, ST2, ST3 and ST4, the energy due to the electrostatic charges is converted to joule energy by burning the TFTs such that the electrostatic charges do not affect the circuits in the active area.

Figure 11:
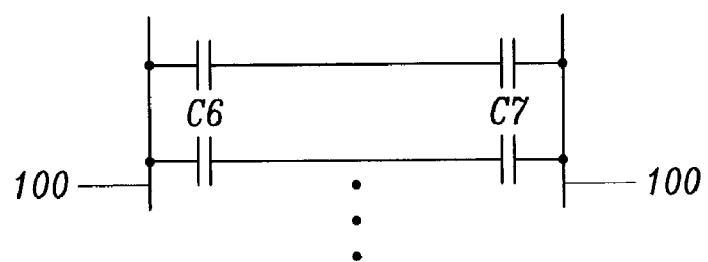
FIG. 11 is a schematic diagram of a first electrostatic charging circuit in FIG. 4.

FIG. 11 shows the first electrostatic charging circuit 140 of FIG. 4. As shown in the drawing, the first electrostatic charging circuit includes capacitors C6 and C7 which are connected to each other in series between two adjacent wires. A plurality of circuits are connected to adjacent wires 100 in parallel. The first electrostatic charging circuit may be located outside the seal 90. It reduces the level of the electrostatic charges of wire 100 by storing them.

Figure 12:
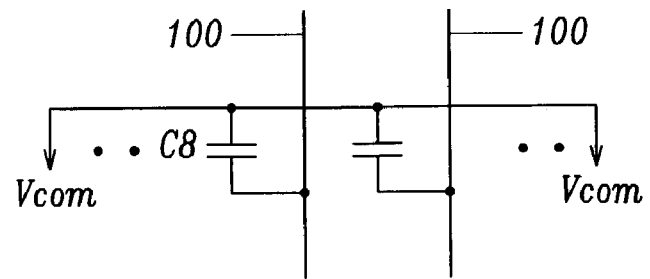
FIG. 12 is a schematic diagram of a second electrostatic charging circuit in FIG. 4.

FIG. 12 shows the second electrostatic charging circuit 150 of FIG. 4. Here, the second electrostatic charging circuit finally removes the remaining electrostatic charges so that they do not enter the active area. As shown in the drawing, a plurality of capacitors C8 are connected between the respective wires 100 and a common electrode voltage Vcom. The second electrostatic charging circuits 150 reduces the level of electrostatic charges by storing them.

Figure 13:
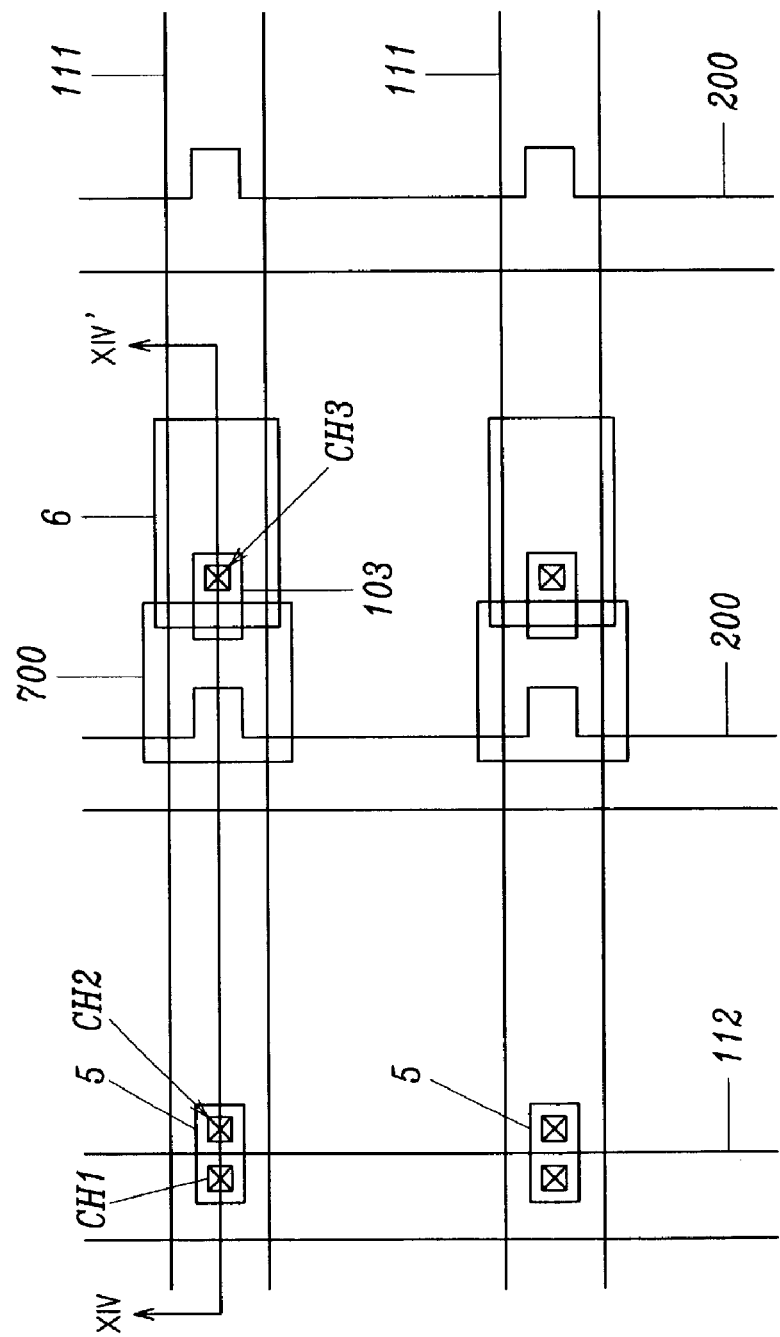
FIG. 13 is a layout view of a pattern of the fourth spark inducing circuit of FIG. 10.
Figure 14:
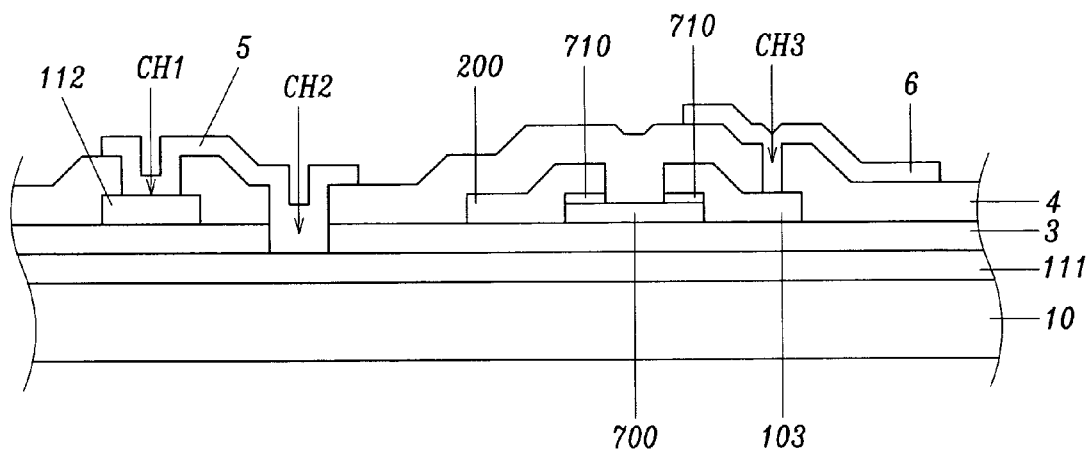
FIG. 14 is a cross sectional view taken along line XIV–XIV' of FIG. 13.

The fourth spark inducing circuit ST4 of FIG. 10 will be described in more detail hereinafter with reference to FIG. 13 illustrating a layout view of the fourth spark inducing circuit ST4 of FIG. 10, and FIG. 14 showing a cross sectional view taken along line XIV–XIV' of FIG. 13.

As shown in FIGS. 13 and 14, the fourth spark inducing circuit includes a TFT pattern and a capacitor. The TFT includes a gate electrode which is a portion of a dummy gate line 111, a gate insulating film 3, a semiconductor pattern 700 formed on the gate insulating film 3 opposite the gate electrode, a source electrode which is a branch of a data line 200 and a metal pattern 103 serving as a drain electrode. The source and drain electrode overlap the either edges of the semiconductor pattern 700. A transparent conductive layer 6 which is connected to the metal pattern 103 and overlaps the dummy gate line 111 to form a storage capacitor. A dummy data line 112 is formed in a vertical direction outside the fourth spark inducing circuits, and connected to all the dummy gate lines 111 through connecting patterns 5.

In detail, a plurality of dummy gate lines 111 are formed on a substrate 10 in a horizontal direction, a gate insulating film 3 is formed thereon, and semiconductor patterns 700 are formed on the gate insulating film 3 opposite the dummy gate line 111. A dummy data line 112 and a plurality of data lines 200 are formed on the gate insulating film 3 in a vertical direction and the data lines 200 overlap one edges of the semiconductor patterns 700. A plurality of metal patterns 103, overlapping the opposite edges of the semiconductor patterns 700 are formed on the gate insulating film 3, and ohmic contact layers 710 for improving electric contact characteristics are formed between the semiconductor patterns 700 and the data lines 200 and the metal patterns 103. An interlayer insulating film 4 covers the dummy data line 112, the data lines 200 and the semiconductor patterns 700. Contact holes C1 and C3 are pierced through the interlayer insulating film 4, and contact holes C2 through the gate insulating film 3 and the interlayer insulating housing 4 expose the dummy gate line 111. Transparent conductive patterns 6 are formed on the interlayer insulating film 4 and connected to the metal pattern 103 through the contact hole C3, and transparent contact patterns 5 on the interlayer insulating film 4 are connected to the dummy date line 112 and the respective dummy gate lines 111 through the contact holes C1 and C2.

In this embodiment, it is desirable that the distance between the dummy gate lines 111 is smaller than that between the gate lines inside the active area to reduce the area occupied by the dummy wires.

In the above spark inducing circuit having the TFT and the capacitor structures, electrostatic charges entering the circuit through the data line 200 or the dummy data line 112, are stored in the capacitor formed between the transparent conductive pattern 600 and the dummy gate 111 and disappear. The electrostatic charges generating from the dummy data line 200 may be converted into joule heat energy by burning the TFT, and may disappear.

Figure 16:
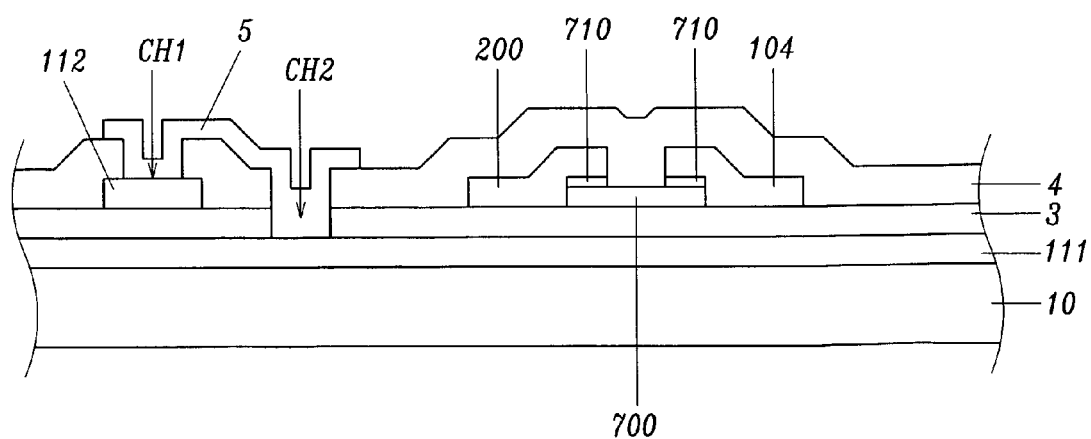
FIG. 16 is a cross sectional view taken along line XVI–XVI' of FIG. 15.
Figure 15:
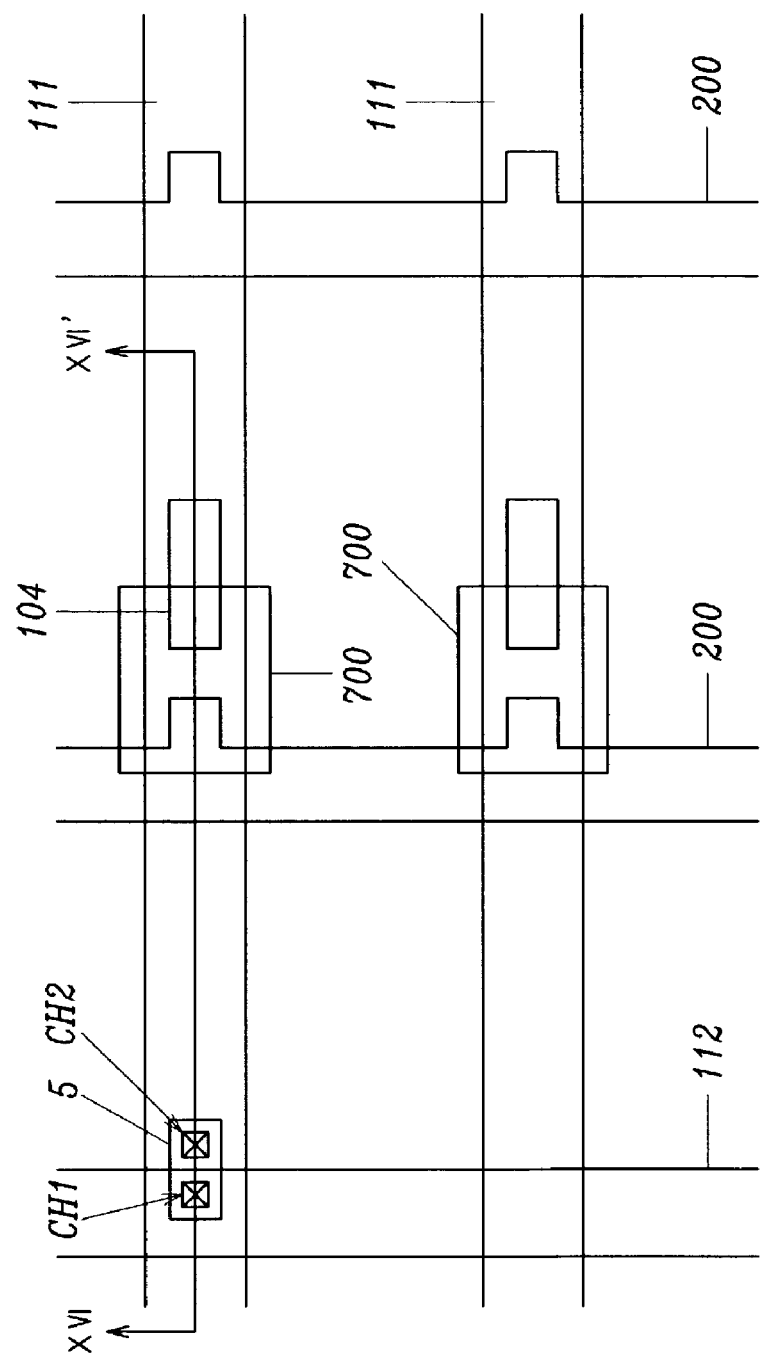
FIG. 15 is a layout view of another pattern of the fourth spark inducing circuit of FIG. 10.

FIG. 15 is another layout view of the fourth spark inducing circuit, and FIG. 16 is a cross sectional view taken along line XVI–XVI' of FIG. 15, in which an enlarged metal pattern 104 is substituted for the transparent conductive pattern for the capacitor. In this structure, the metal pattern 104 is enlarged to overlap the dummy gate line 111 such that a predetermined storage capacitance is formed between the metal pattern 104 and the dummy gate line 111. Electrostatic charges are stored and dissipate like the fourth spark inducing circuit ST4 described with reference to FIGS. 13 and 14.

To prevent electrostatic charges from entering the active area, it is preferable to form dummy pixels having a structure similar to the pixels in the active area.

Figure 17:
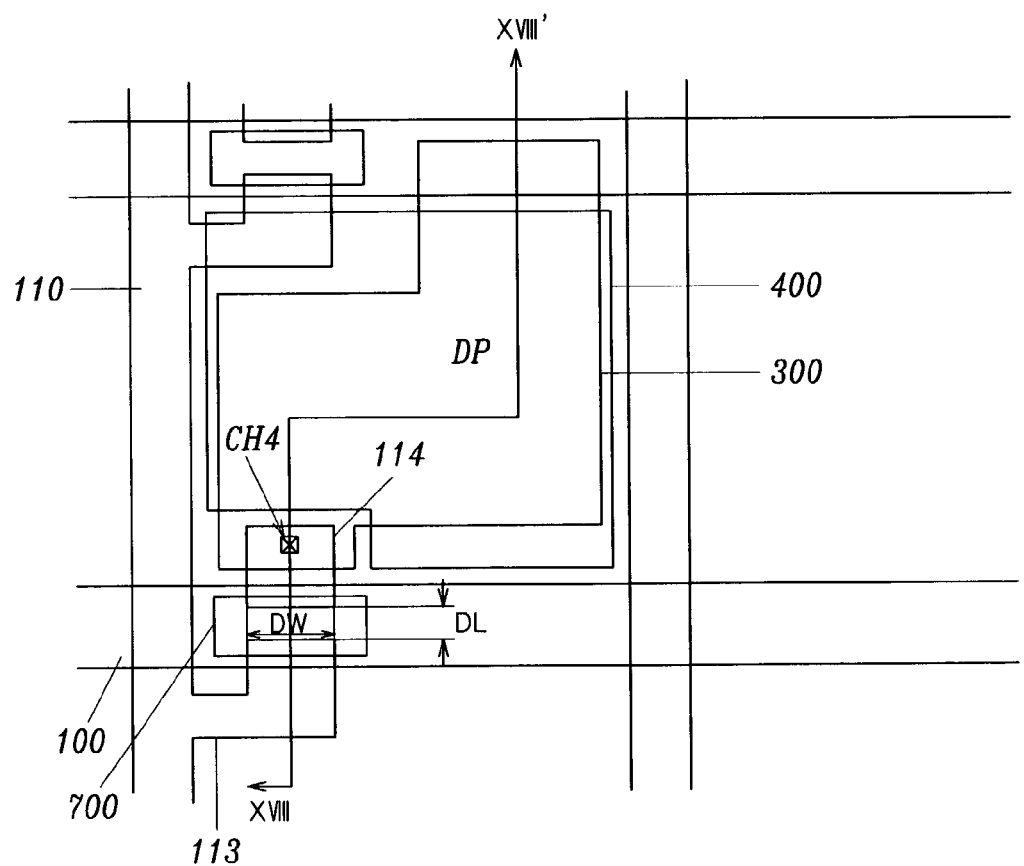
FIG. 17 is a layout view of a dummy pixel for discharging electrostatic charges according to a preferred embodiment of the present invention.
Figure 18:
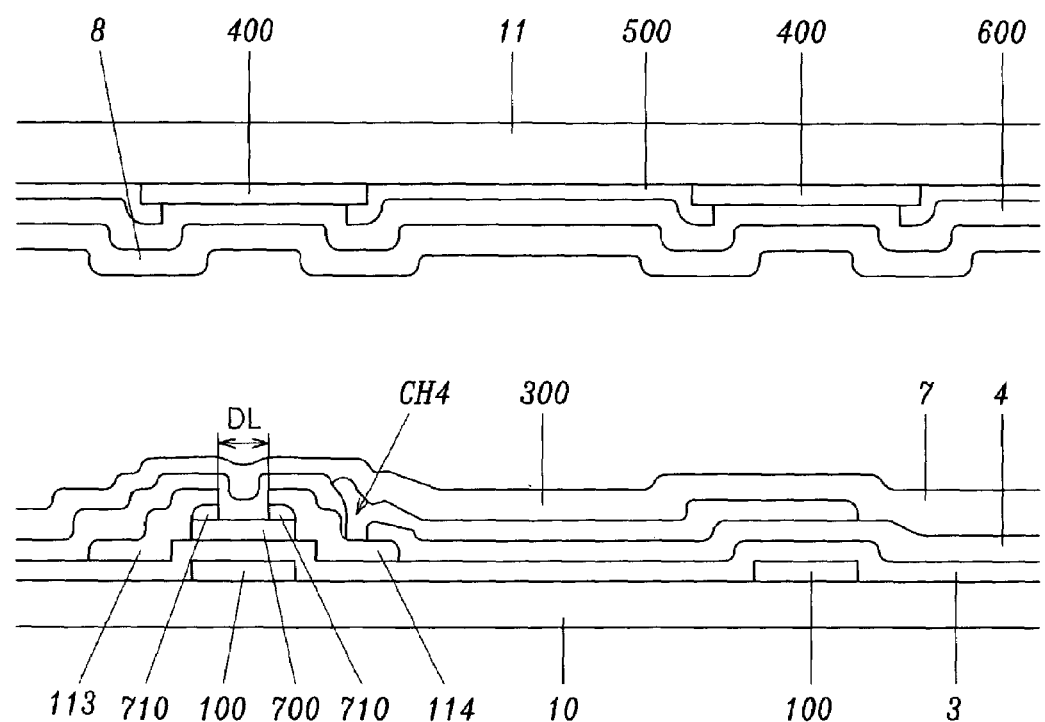
FIG. 18 is a cross sectional view taken along line XVII-I–XVIII' of FIG. 17.

FIG. 17 shows a layout view of a dummy pixel for discharging electrostatic charges according to a preferred embodiment of the present invention, and FIG. 18 is a cross sectional view taken alone the line XVIII–XVIII' of FIG. 17.

As shown in the drawings, a gate line or a dummy gate line 100 is formed on the first substrate 10 in a horizontal direction. The portion of the gate line or the dummy gate line 100 functions as a dummy gate electrode. A gate insulating layer film 3 covers the dummy gate line 100, and a dummy amorphous silicon layer 700 is formed on the gate insulating film 3 over the dummy gate electrode. A dummy data line 110 is formed on the gate insulating film 3 in a vertical direction. The dummy gate line 100 and the dummy data line 110 cross each other and define a dummy pixel DP. The dummy pixel may be defined by the gate line and the dummy data line or by the dummy data line and the dummy gate line.

A dummy source electrode 113, which branches from the dummy data line 110, overlaps an edge of a doped amorphous silicon layer 710, and a dummy drain electrode 114 overlaps another edge of the doped amorphous silicon layer 710 at the opposite side of the dummy source electrode 113.

A highly doped amorphous silicon layer 710 is formed at the contact surface of the dummy electrode 113 and 114 and the dummy amorphous silicon layer 710.

The width of the dummy source and drain electrodes 113 and 114 is the channel width formed in the dummy amorphous silicon 700, and the distance between the dummy source electrode 113 and the dummy drain electrode 114 is a channel length DL. Here, the channel width of the dummy pixel TFT is different from that of the TFT in the active area. Also, the channel length of the dummy pixel TFT is different from that of the active pixel TFT.

As described above, in order to induce electrostatic charges into the dummy pixel, it is preferable that the ratio of the channel width to the channel length in the dummy pixel is more than twice than that in the active area.

A passivation film 4 is formed on the dummy data line 110 and the dummy amorphous silicon layer 700, and a contact hole C4 is formed in the passivation film 4 to expose the dummy drain electrode 114. A pixel electrode 300, which is connected to the dummy drain electrode 114 through the contact hole C4, is made of indium-tin-oxide (ITO) on the passivation film 4. The pixel electrode 300 partially overlaps the adjacent dummy gate line 100.

An alignment film 7 covering the passivation film 4 is formed on the first substrate 10. A black matrix 400, with an opening area for the dummy pixel DP, is formed at the second substrate 11 facing the first substrate 10. A color filter 500, overlapping the edges of the black matrix 400, is formed in the pixel region DP. Further, a transparent and conductive common electrode 600 and an alignment film 8 are, in this order, formed over the color filter 500 and the black matrix.

Although the black matrix 400 is formed on the second substrate 11 in the LCD according to the present invention, it is possible to form those elements on the first substrate 10. In this embodiment, the dummy gate line 100 and the dummy data line 110 are formed outside the active area to prevent electrostatic charges from entering the active area. In addition, a plurality of the dummy TFTs may be formed in the dummy pixel.

Figure 19:
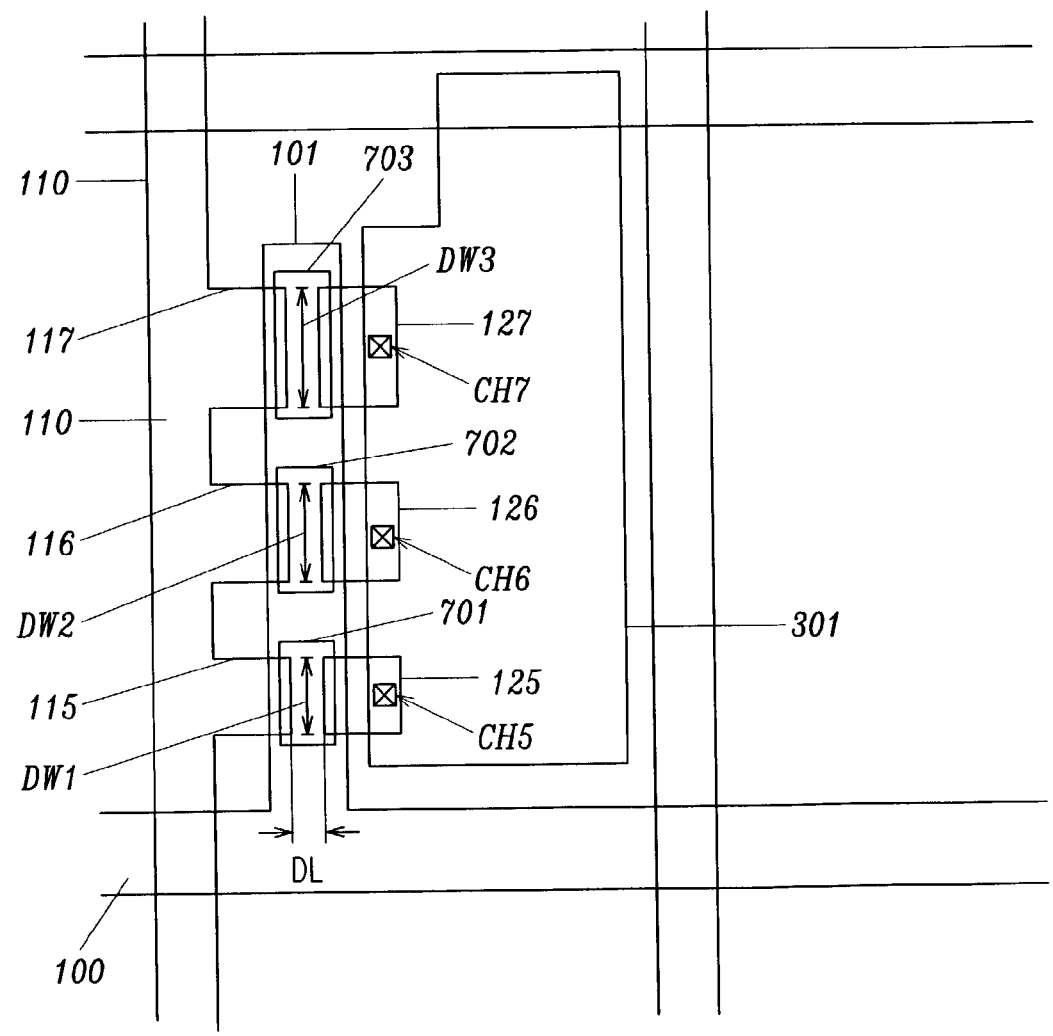
FIG. 19 is a layout view of a dummy pixel for discharging electrostatic charges according to another preferred embodiment of the present invention.

FIG. 19 is a layout view of a dummy pixel for discharging electrostatic charges according to another preferred embodiment of the present invention. As shown in the drawing, the structure of the discharging dummy pixel is substantially identical to the structure of the dummy pixel shown in FIG. 17, but the dummy gate electrode 101, which is connected to the dummy gate line 100, is extended into the dummy pixel region. Moreover, three (i.e., a plurality) of source electrodes 115, 116 and 117 are connected to the dummy data line 110, and dummy drain electrodes 125, 126 and 127, which respectively correspond to the dummy source electrodes 115, 116 and 117, are connected to the dummy pixel electrode 301 through contact holes C5, C6 and C7.

The width DW1 of the first dummy source and drain electrodes 115 and 125 is narrower than the width DW2 of the second dummy source and drain electrode 116 and 126, and the width DW2 of the second dummy source and drain electrodes 116 and 126 is narrower than the width DW3 of the third dummy source and drain electrodes 117 and 127. In this embodiment, all the distances DL between the dummy source electrodes 115, 116 and 117 and the dummy drain electrodes 125, 126 and 127 are the same. However, it is possible to have these distances different from each other.

Pixel defects in the active area can be avoided by changing the structure of the dummy TFT as described above and by quickly inducing electrostatic charges to the dummy TFT in the dummy pixel.

Figure 20:
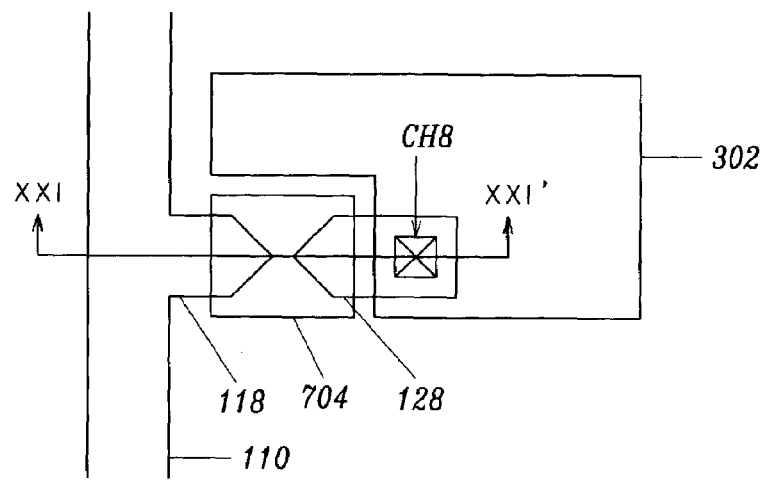
FIG. 20 is a layout view of a pattern for discharging electrostatic charges according to a first preferred embodiment of the present invention.
Figure 21:
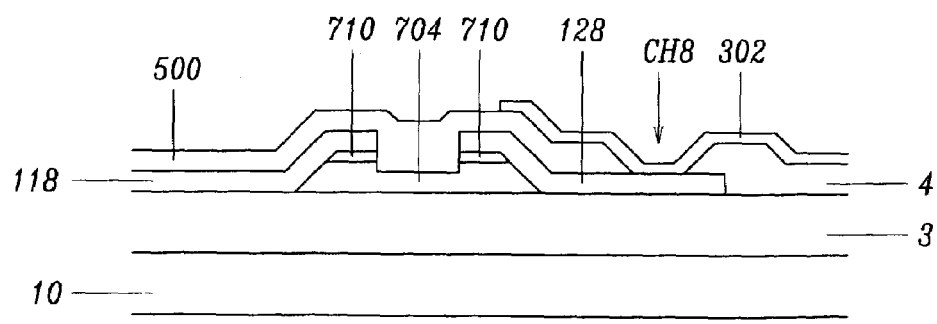
FIG. 21 is a cross sectional view taken along line XXI–XXI' of FIG. 20.

Another discharging pattern for preventing electrostatic charges from entering the active area is described hereinafter. FIG. 20 shows a layout view of a discharging pattern according to a first preferred embodiment of the present invention. FIG. 21 shows a cross sectional view taken along line XXI–XXI' of FIG. 20, and FIG. 22 is a perspective view of a capacitor which is formed at the end of the discharging pattern.

A data line or a dummy data line 110 is formed on a gate insulating film 3 over a substrate 10, and an amorphous silicon pattern 704 for discharging electrostatic charges is formed on the gate insulating film 3. The first electrode pattern 118, which overlaps an edge of the amorphous silicon pattern 704, is extended from the data line or the dummy data line 110, and the second electrode pattern 128 overlaps another edge of the amorphous silicon pattern 704 at the opposite side of the first electrode pattern 118. The ends of the first and the second electrode patterns 118 and 128 are tapered to a point, and a doped amorphous silicon pattern 710, such as an Ohmic contact layer, is formed at the contact surface of the first and the second electrode patterns 118 and 128 and the amorphous silicon pattern 704. A passivation film 4 is formed over the dummy data line 110, and the first and the second electrode patterns 118 and 128; and a contact hole C8 is formed through the passivation film 4 to expose the second electrode pattern 128. An ITO pattern 302 for the capacitor is formed on the passivation film 4 and overlaps the second electrode pattern 128. The ITO pattern 302 for the capacitor is connected to the second electrode pattern 128 through the contact hole C8.

In other words, the discharging pattern includes the amorphous silicon pattern 704, the ITO pattern 302 for the capacitor for storing electrostatic charges, and the first and the second electrode patterns 118 and 128 which interlink the ITO pattern 302 and the amorphous silicon pattern 704 to the dummy data line 110. In the LCD having this discharging pattern, electrostatic charges generated in the dummy data line 110 often passes to the ITO pattern 302 through the amorphous silicon pattern 302 and the second electrode pattern 128. Thus, the amorphous silicon does not breakdown. The reason that the tunneling effect is superior to the breakdown effect is that the first and the second electrode patterns 118 and 128 make the electrostatic charges accumulate at the ends of the electrode patterns 118 and 128, and tunnel through the amorphous silicon without breaking down the silicon pattern.

Figure 22:
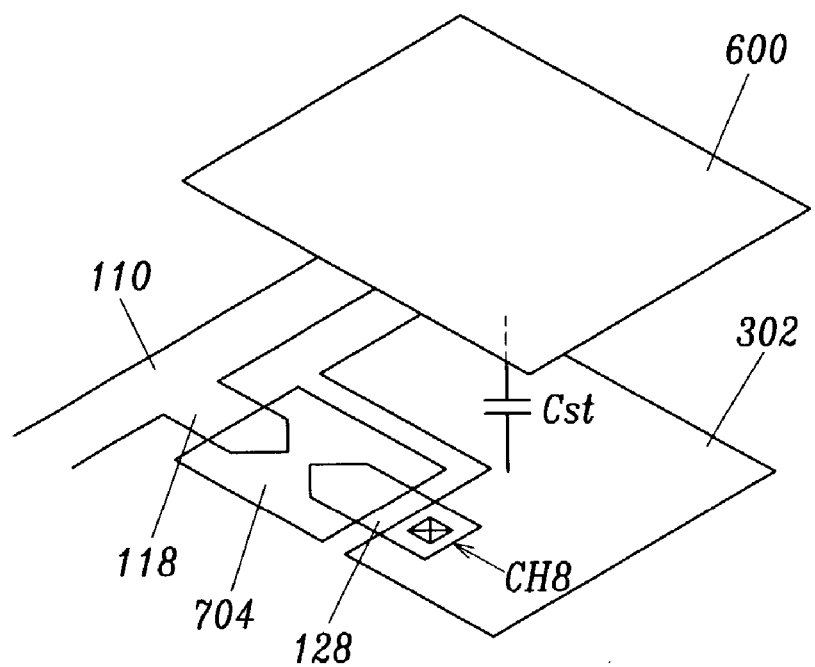
FIG. 22 is a perspective view of a capacitor formed at the end of the pattern for discharging electrostatic charges.

As shown in FIG. 22, the ITO pattern 302 of the discharging pattern faces a common electrode 600 of an upper color filter substrate. Liquid crystal material LC is interposed between the ITO pattern 302 and the common electrode 600 so that a storage capacitor Cst is formed at the end of the discharging pattern. Since the electrostatic charges entering the ITO pattern 302 are stored in the storage capacitor formed between ITO pattern 302 and the common electrode 600, the TFT in the active area is not affected by the electrostatic charges.

Figure 23:
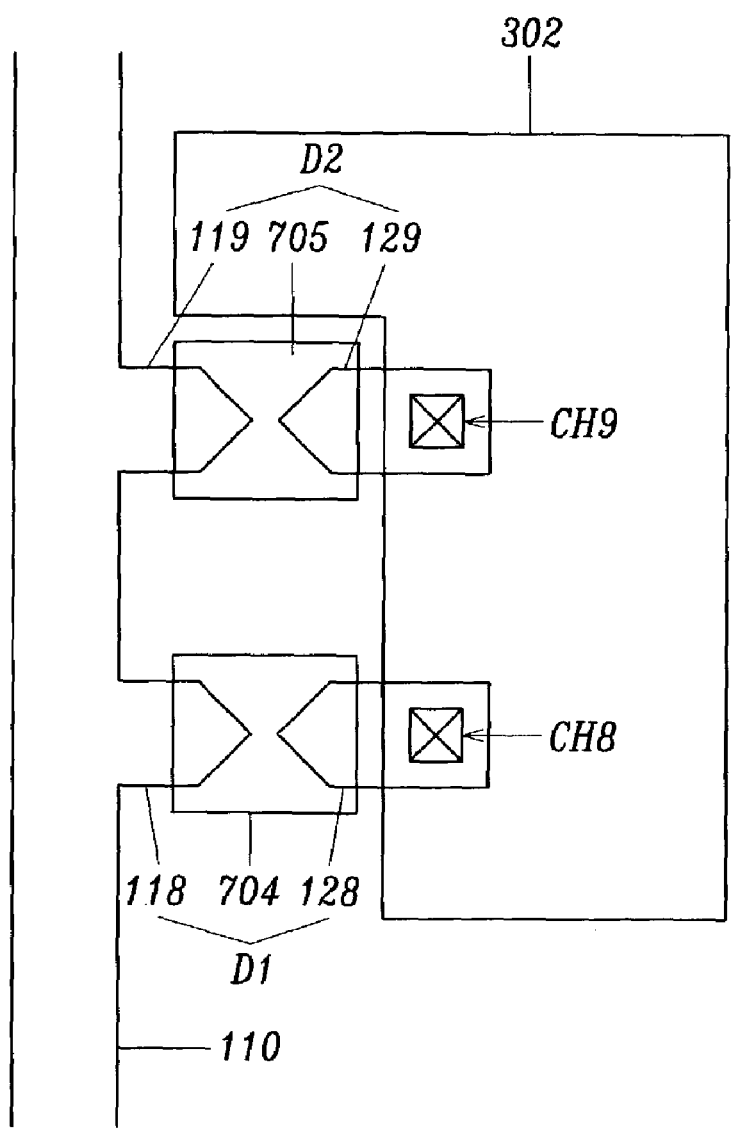
FIG. 23 is a layout view of a pattern for discharging electrostatic charges according to a second preferred embodiment of the present invention.

FIG. 23 shows a layout view of a discharging pattern according to a second preferred embodiment of the present invention. The structure of the discharging pattern of the second embodiment is similar to that of the first embodiment, but more than two discharging devices are connected to the ITO pattern 302 and the dummy data line 110 in parallel.

As shown in FIGS. 21 and 23, the first discharging device, which includes the first amorphous silicon pattern 704 and the first and the second electrode patterns 118 and 128, and the second discharging device, which includes the second amorphous silicon pattern 705 and the third and the fourth electrode patterns 119 and 129, are formed on a gate insulating film 3. The first and the second discharging devices are connected to the dummy data line 110 in parallel. Contact holes C8 and C9 to expose the second and the fourth electrode pattern 128 and 129 are made through the passivation film 4, and the second and the fourth electrode patterns 128 and 129 are connected to the ITO pattern 302 for the capacitor via the contact holes C8 and C9.

As described in the discharging pattern of the first embodiment, the ends of the first to the fourth electrode pattern 118, 128, 119 and 129 are shaped like an arrow at the end. The first and the third electrode patterns 118 and 119 respectively face the second and the fourth electrode pattern 128 and 129. The first and the second patterns 118 and 128 are formed on the first amorphous silicon pattern 704, and the third and fourth patterns 119 and 129 are formed on the second amorphous silicon pattern 705. Thus, the electrostatic charges flowing through the dummy data line 110 are discharged to the ITO pattern 302 through the pointed end portion and stored in the capacitor formed by ITO pattern 302 and the common electrode. The number of the discharging devices D1 and D2 which are connected to the dummy data line 110 may be increased as required.

Figure 24:
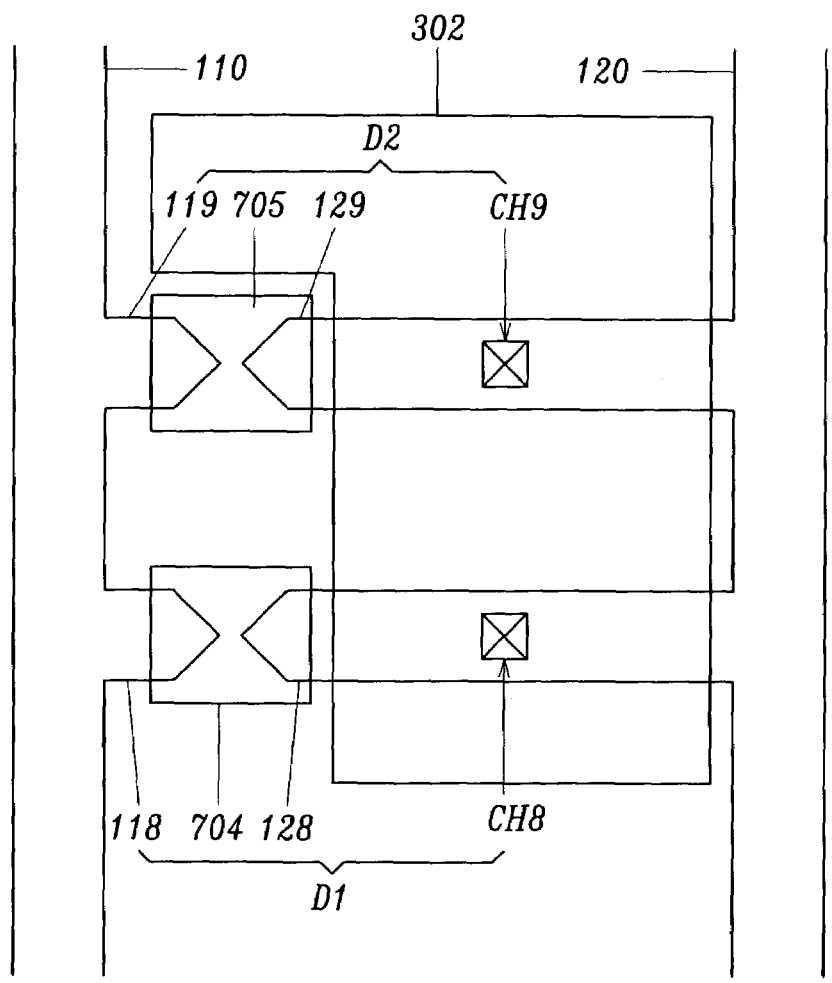
FIG. 24 is a layout view of a pattern for discharging electrostatic charges according to a third preferred embodiment of the present invention.

FIG. 24 shows a layout view of a electrostatic charge discharging pattern according to a third preferred embodiment of the present invention. As shown in FIG. 24, the second electrode pattern 128 of the first discharging devices D1 and the fourth electrode pattern 129 of the second discharging devices D2 are connected to the adjacent data lines 120. The number of the discharging devices may be increased as required.

The structures of the discharging patterns of the first through third embodiments described above have advantages in handling electrostatic charges generated in the assembly step, the liquid crystal injection step, or the visual test step, since the capacitor is formed after the upper and the lower substrates for the LCD are assembled.

Figure 25:
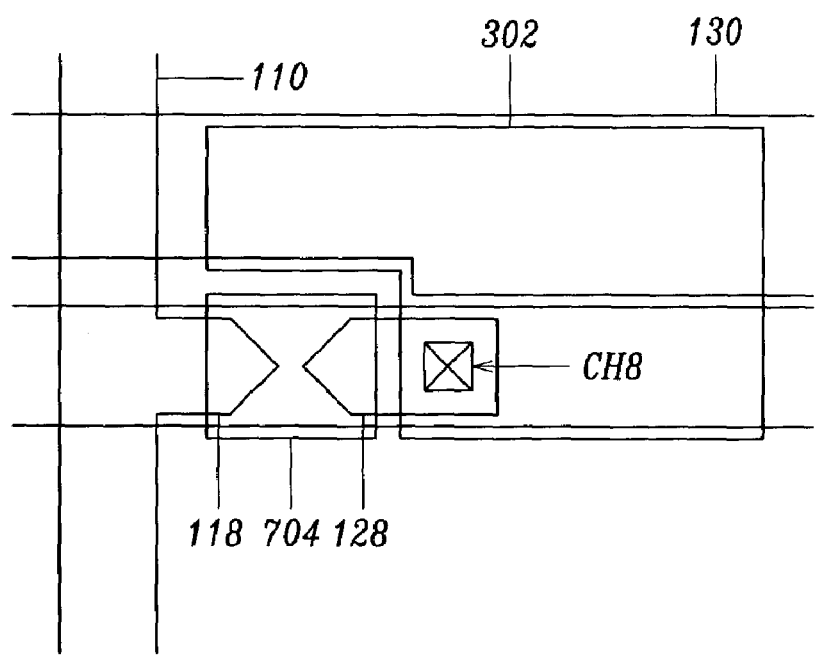
FIG. 25 is a layout view of a pattern for discharging electrostatic charges according to a fourth embodiment of the present invention.

FIG. 25 shows a layout view of a discharging pattern according to a fourth preferred embodiment of the present invention. As shown in the drawing, the structure of the discharging pattern of the fourth embodiment is almost the same as that of the first embodiment, but the dummy metal line 130 is formed on the substrate 10 in a horizontal direction. The dummy metal line 130 is grounded and overlaps the ITO pattern 302 for the capacitor through a gate insulting film and a passivation film. Therefor, a capacitor is formed between the ITO pattern 302 and the dummy metal line 130 to store electrostatic charges passing from the first electrode pattern 118 to the second electrode pattern 128 and the ITO pattern 302 by a tunneling effect in the amorphous silicon pattern 704.

The discharging pattern of the fourth embodiment can discharge electrostatic charges more effectively because one more capacitor is formed by the wires on the substrate.

Now, a manufacturing method of the electrostatic charge discharging patterns will be described hereinafter with reference to FIGS. 21, 25, and FIGS. 26A through 26F.

Figure 26A:
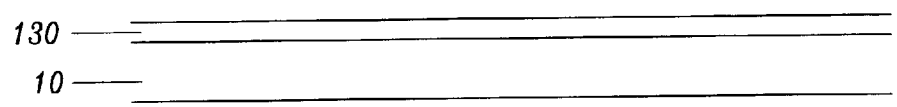
FIGS. 26A to 26F are cross sectional views used to describe a manufacturing method of the patterns for discharging electrostatic charges of the first, second and third embodiments of the present invention.

As shown in FIG. 26A, a metal layer for gate wires is deposited on a substrate 10 and patterned to form a gate line and a dummy gate line 100 respectively inside and outside of active area. The discharging pattern of the fourth preferred embodiment forms a dummy metal line 130 outside an active area in parallel with the gate line and the dummy gate line 100 in this step.

Figure 26B:
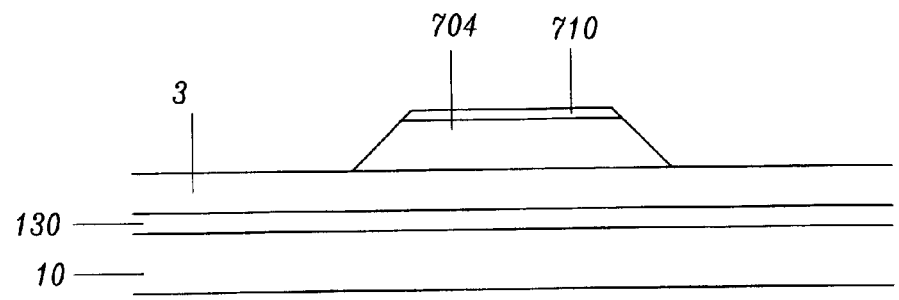

As shown in FIG. 26B, a gate insulating film 3 of silicon nitride or silicon oxide is deposited. Next, outside the active area, an amorphous silicon and a doped amorphous silicon are deposited and then patterned to form an amorphous silicon pattern 704 for discharging electrostatic charges and a doped amorphous silicon layer 710.

Figure 26C:
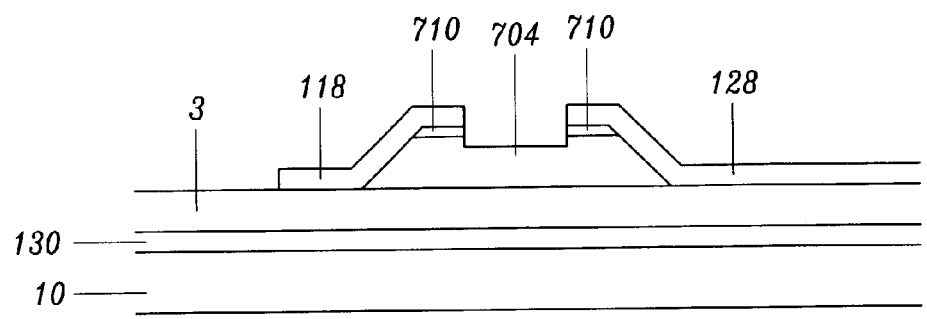

Subsequently, as shown in FIG. 26C, a metal layer for data wires is deposited and patterned to form a data line, a dummy data line 110, the first electrode pattern 118, and the second electrode pattern 128. When two or more discharging devices are formed, a plurality of pairs of electrode patterns 118, 128, 119, 129 are formed in this step. The doped amorphous silicon material, which is extremely exposed, is the removed.

Figure 26D:
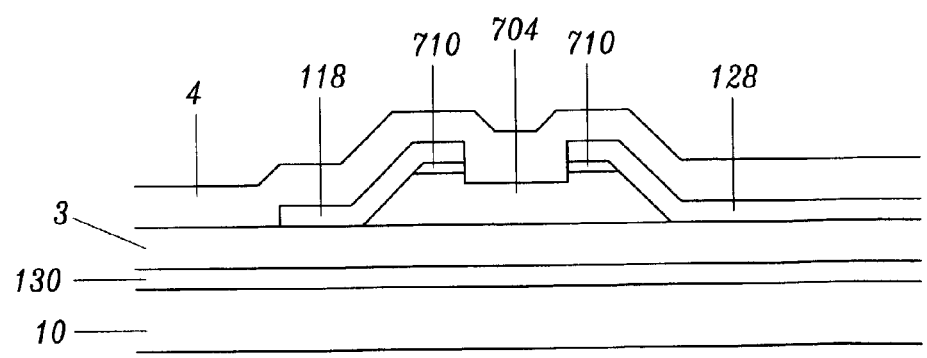
Figure 26E:
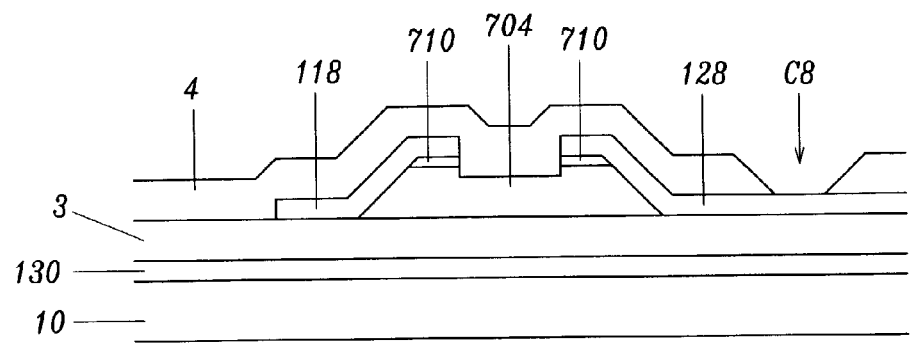
Figure 26F:
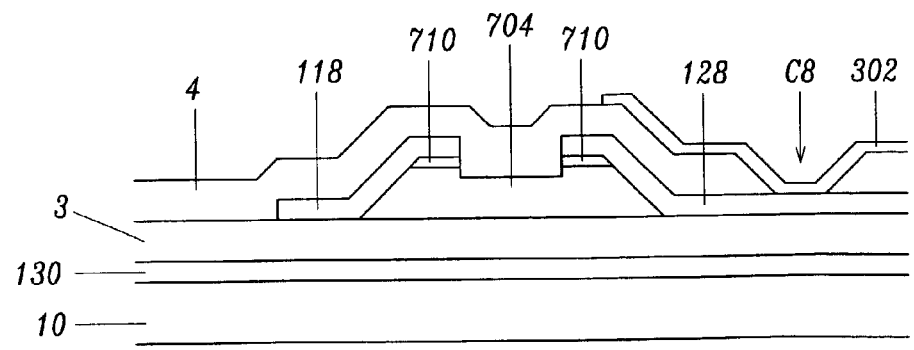

As shown in FIGS. 26D and 26E, a passivation film 4 is deposited and then the gate insulating film 3 and the passivation film 4 are patterned to form contact holes C8 and C9 to expose the second and the fourth electrode pattern 128 and 129. As shown in FIG. 26F, an ITO layer is deposited and patterned to form an ITO pattern 302 for a capacitor.

Next, another circuit for protecting the substrate from the damage by an electrostatic discharge will be described with reference to FIG. 27.

Figure 27:
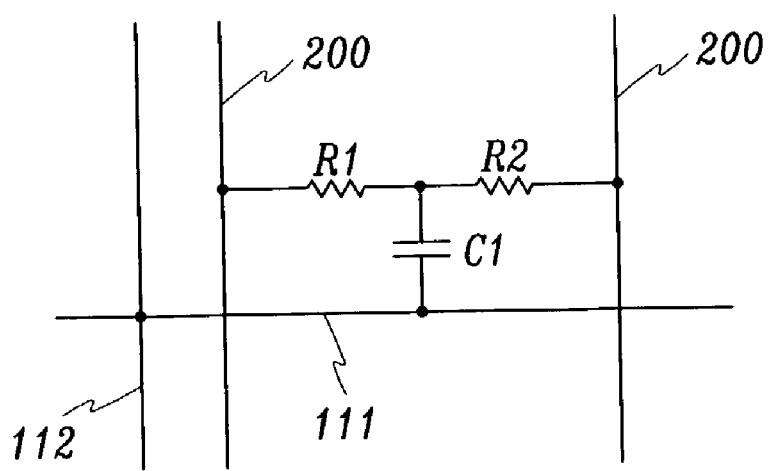
FIG. 27 is a schematic diagram of a circuit for preventing electrostatic charges which is connected to a portion of A in FIG. 3 according to a third preferred embodiment of the present invention.

FIG. 27 is another schematic diagram of a circuit for preventing electrostatic charges, which is connected to a portion of A in FIG. 3, according to a third preferred embodiment of the present invention.

As shown in FIG 27, a first resistor R1 and a capacitor C1 are connected to each other in series between a data line 200 and a dummy gate line 111, and the capacitor C1 and another data line 200 are also connected in series by a second resistor R2. The dummy gate line 111 is electrically connected to a dummy data line 112 formed outside the data line 200.

The electrostatic charges generated along the data line 200 passes through the resistors R1 and R2 to disperse in a moment. The electrostatic charges generated to the dummy data line 112 moves along the dummy gate line 111 and are stored to the capacitor C1 formed by the data line 200 and the dummy gate line 111.

The disappearance of the electrostatic charges will be described with reference to FIGS. 28 and 29.

Figure 28:
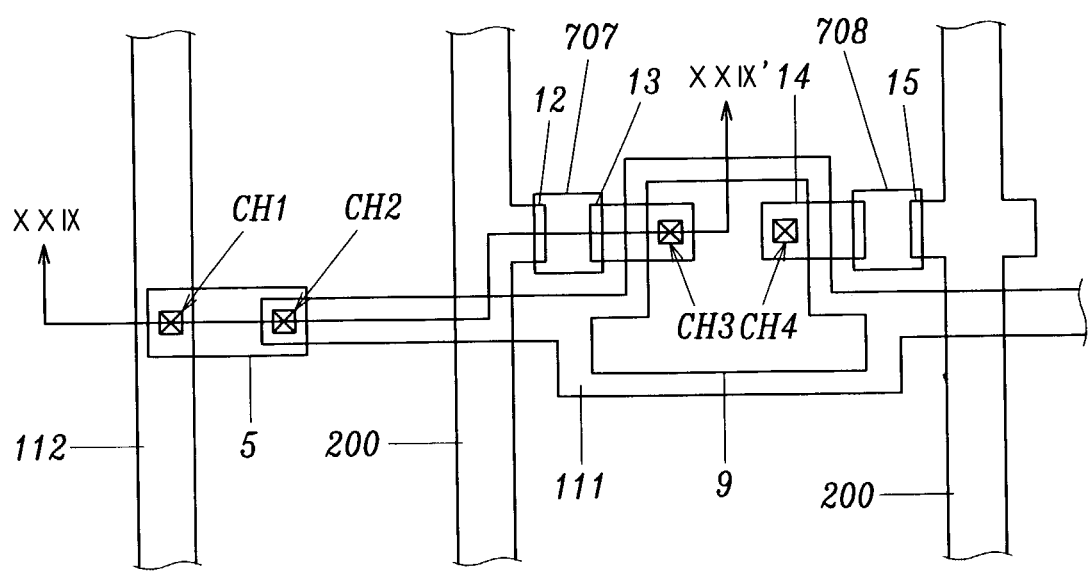
FIG. 28 is a layout view of the pattern of the circuit in FIG. 27.
Figure 29:
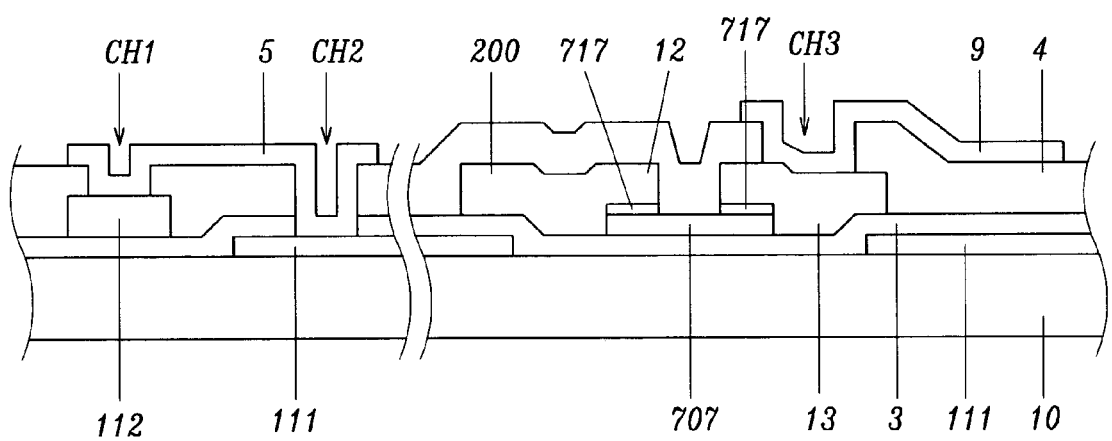
FIG. 29 is a cross sectional view taken along line XXIX–XXIX' of FIG. 28.

FIG. 28 is a layout view of the pattern of the circuit in FIG. 27, and FIG. 29 is a cross sectional view taken along line XXIX–XXIX' of FIG. 28.

In general, since the device for protecting a substrate from electrostatic charges should be formed in narrow area between an active area and pads, there is a limitation in minimizing the electrostatic charges by increasing the capacitance of the capacitor. In this embodiment, a semiconductor pattern as a resistance, which connects a capacitor to two adjacent data lines at the same time, is used to easily dissipate more electrostatic charges.

As shown in FIGS. 28 and 29, a plurality of gate lines (not shown) are formed on a transparent insulating substrate 10 in a horizontal direction, at least one dummy gate line 111 is formed outside the gate line in the horizontal direction, and a gate insulating film 3 covers the gate lines and the dummy gate line 111.

On the gate insulating film 3, a plurality of semiconductor pattern 707 and 708 of amorphous silicon are formed near the dummy gate line 111, and a plurality of data lines 200 are formed. Two or more semiconductor patterns 707 and 708 are located between the two adjacent data lines 200. If one of the patterns is named a first semiconductor pattern 707, and the other of the patterns is named a second semiconductor pattern 708, a first electrode 12 connected to the data line 200, and a second electrode 13 facing the first electrode 12 respectively overlap the both sides of the first semiconductor pattern 707. Moreover, a third electrode 15 connected to the other adjacent data line 200, and a fourth electrode 14 facing the third electrode 15 respectively overlap the both sides of the second semiconductor pattern 708. An Ohmic contact 717 to improve the contact characteristic is laid between the first, the second, the third and fourth electrodes 12, 13, 15 and 14 and the first and the second semiconductors 707 and 708.

At least one dummy data line 112 is formed outside the data line 200 in parallel with the data line 200.

A passivation film 4 covers the data line 200 and the dummy data lines 112, and contact holes C1, C2, C3, and C4, through which the dummy data line 112, the end of the dummy gate line 111, the second and the fourth electrodes 13 and 14 are exposed, are formed through the passivation film 4.

A connecting pattern 5, which overlap the dummy data line 112 and the dummy gate line 111, is formed on the passivation film 4 to connect the dummy data line 112 and the dummy gate line 111. A capacitor pattern 9, which overlaps the second and the fourth electrodes 13 and 14 and the dummy gate line 111, is formed to connect the second and the fourth electrodes 13 and 14 through the contact holes C3 and C4. The connecting pattern 5 and the capacitor pattern 9 may be made of transparent indium-tin-oxide (ITO).

As mentioned above, since the dummy gate line 111 is connected to the dummy data line 112, the electrostatic charges generated along the dummy data line 112 is transmitted to the dummy gate line 111 and is stored between the capacitor pattern 9 and the dummy gate line 111. The electrostatic charges generated along the data line 200 loses its energy by passing through the first and the second semiconductor patterns 707 and 708 to be transmitted to the capacitor pattern 9, or by demolishing the first and the second semiconductor patterns 707 and 708.

Figure 30:
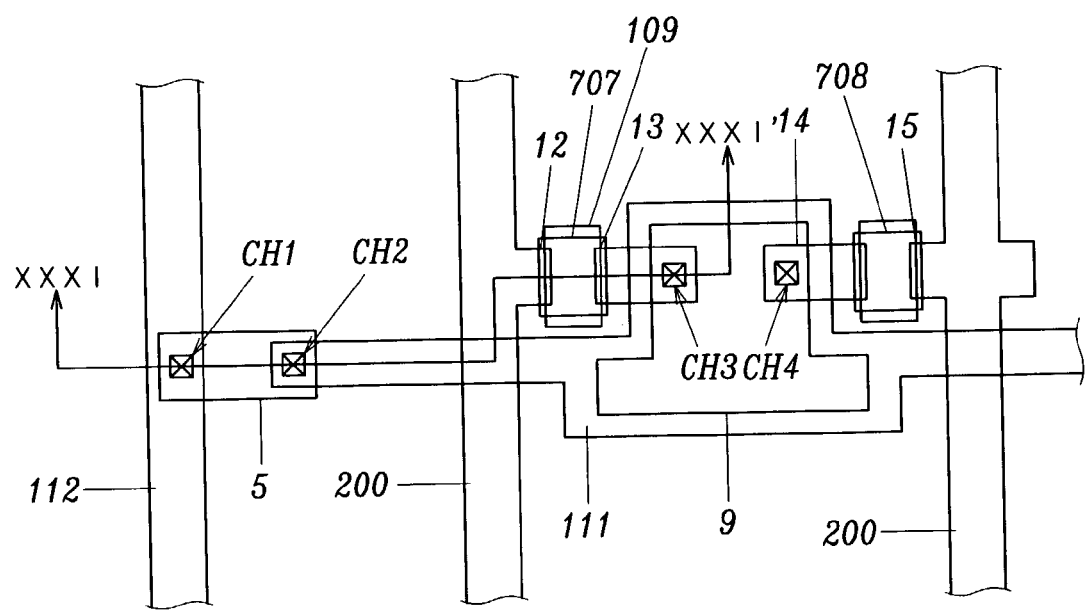
FIG. 30 is a layout view of the pattern of the circuit for preventing an electrostatic discharge which is connected to a portion of A in FIG. 3 according to a fourth preferred embodiment of the present invention.
Figure 31:
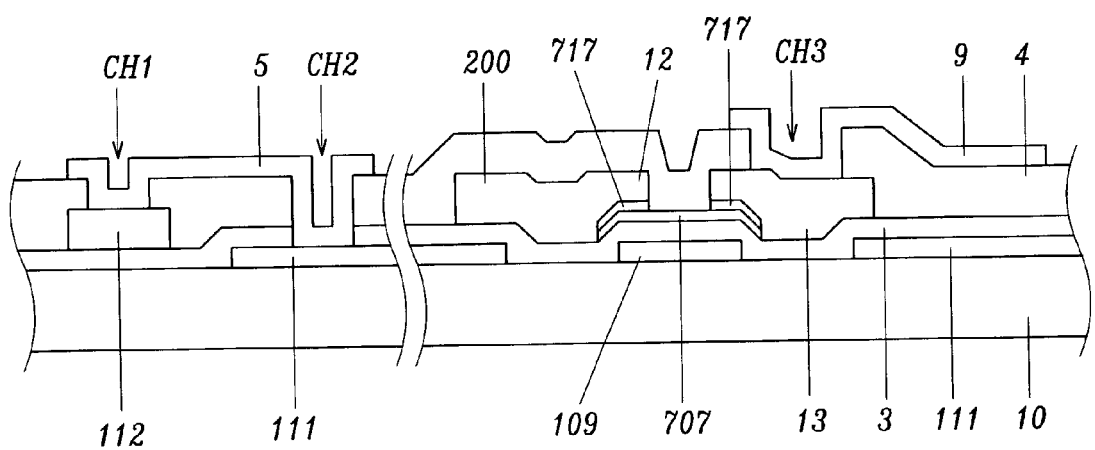
FIG. 31 is a cross sectional view taken along line XXXI–XXXI' in FIG. 30.

FIG. 30 is a layout view of the circuit for preventing electrostatic charges which is connected to a portion of A in FIG. 3 according to a fourth embodiment of the present invention, and FIG. 31 is a cross sectional view taken along line XXXI–XXXI' of FIG. 30.

As shown in FIGS. 30 and 31, fifth electrodes 109 are respectively formed under the first and the semiconductor patterns 707 and 708, so another capacitance is formed between the fifth electrodes 109 and the first and the second semiconductor patterns 707 and 708.

The rest of the circuit structure is the same as in the third embodiment.

Figure 32:
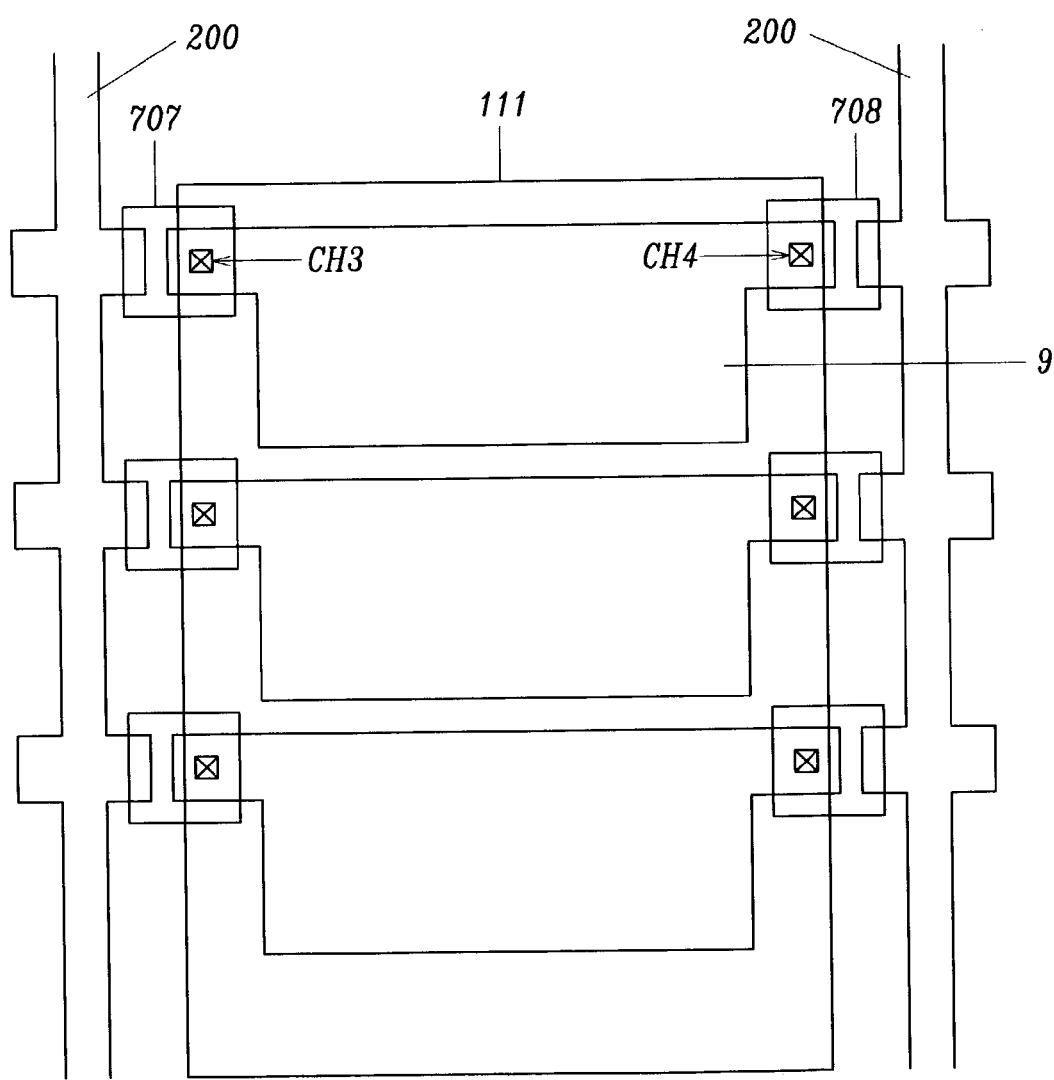
FIG. 32 is a layout view of the pattern of the circuit for preventing an electrostatic discharge which is connected to a portion of A in FIG. 3 according to a fifth preferred embodiment of the present invention.

FIG. 32 is a layout view of the circuit for preventing an electrostatic discharge which is connected to the portion A of FIG. 3, according to a fifth preferred embodiment of the present invention.

As shown in FIG. 32, a plurality of data lines 200 are formed on an insulating form (not shown) and arranged parallel to each other. A plurality of semiconductor layers 707 and 708 are formed on opposite sides with respect to the data line 200 and each semiconductor layer overlaps one of the portions extended from the data line 200. A plurality of capacitance patterns 9 are formed on the same layer as the data lines 200 and are separated from the data lines 200. The capacitance patterns 9 are arranged in a column between the two data lines 200 and each pattern 9 overlaps edges of the semiconductor layers 707 and 708 at the side opposite of the portions extended from the data lines 200.

A plurality of dummy gate lines 111 are formed under the insulating film, that, is, located below the data lines 200, and floated. Each dummy gate line 111 is formed between the two data lines 200 and arranged along the data lines 200. Therefore, a dummy gate line 111 overlaps all the capacitance patterns 9 between two data lines 200 at the same time. As a result, sufficient capacitance can be obtained.

In this embodiment, the dummy gate line 111 is electrically floated.

Now, a manufacturing method of the LCD, minimizing the damage by an electrostatic discharge, will be described hereinafter with reference to FIGS. 33 and 34.

Figure 33:
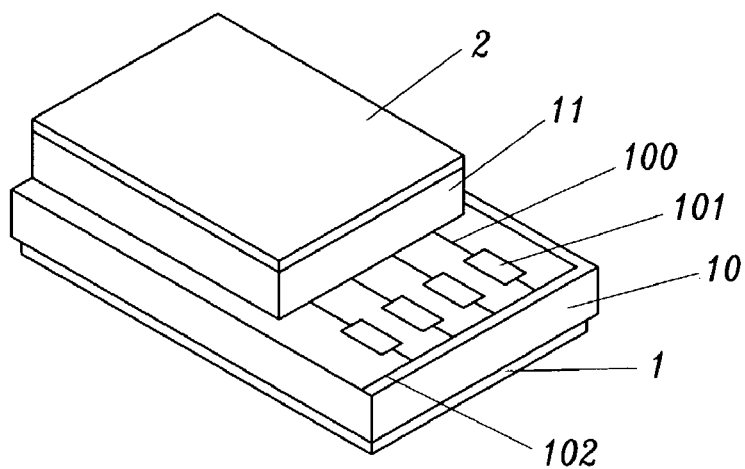
FIG. 33 is a perspective view of an LCD showing a state in which a thin film transistor substrate and a color filter substrate are assembled to each other.
Figure 34:
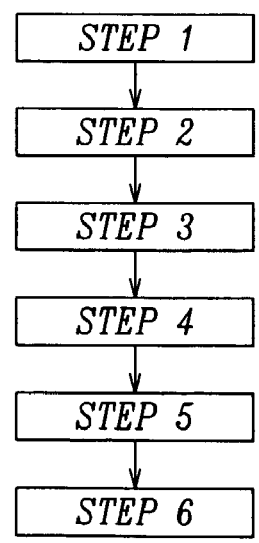
FIG. 34 is a flow chart showing a manufacturing method of an LCD according to the present invention.

FIG. 33 shows a perspective view of an LCD showing a state in which a thin film transistor substrate and a color filter substrate are assembled to each other, and FIG. 34 shows a flow chart showing a manufacturing method of an LCD according to a present invention.

As shown in FIGS. 33 and 34, in STEP 1, a plurality of wires 100 are formed on a transparent insulating substrate 10, and a shorting bar 102, which links all the wires 100 and the pads 101 for contacting with external driving circuits, is formed outside the wires 100. In this step, electrostatic charge dispersing circuits, such as the diodes, the spark inducing circuits, the electrostatic charging circuits and the discharging patterns, are formed to complete the TFT substrate 10 and a cooler filter substrate, having a color filter and a common electrode, are formed.

Next, in STEP 2, the TFT substrate 10 and the color filter substrate 11 are cut to each display, the substrates 10 and 11 facing each other. And liquid crystal is injected between the substrates 10 and 11. Electrostatic charges, generating in the step of cutting the substrates 10 and 11 and in the step of injecting the liquid crystal material, are dispersed by the shorting bar 102.

In STEP 3, a hole used to inject the liquid crystal material is sealed and then the shorting bar 102 is removed by a grinding process. In STEP 4, test signals are applied to each wire 100 to detect defects in the LCD substrate. In this test, it is possible to perform a variety of tests by applying different test signals to each of the wires 100 by using probes contacting to each of the pads 101. Electrostatic charges generated in this step dissipates through the spark inducing circuits, electrostatic charging circuit, and discharging patterns.

In STEP 5, polarizers 1 and 2 are attached on outer surfaces of the LCD substrates that have no defects. In STEP 6, driving circuits are connected to the pads of the LCD. Generally, electrostatic charges easily generate in the step of attaching the polarizers 1 and 2. In this method, the electrostatic charges are effectively dispersed through the spark inducing circuit and the electrostatic charging circuit, so that the electrostatic charges can be kept from the active area.

Unlike the conventional method, in this manufacturing method of the LCD, since the steps of cutting the substrate, injecting the liquid crystal, and sealing the injection hole are performed with the shorting bar 102 present, the LCD substrate is protected from electrostatic charges generated during those processes. In addition, since the polarizers 1 and 2 are attached on substrates that have passed the visual test, manufacturing costs are reduced.

As described above, the LCD according to the present invention has a dummy line outside the active area, a plurality of electrostatic charge dispersing circuits connected to the dummy line and the electrostatic charge dispersing circuit having a suitable structure to effectively discharge electrostatic charges. Thus, electrostatic charges can be kept from damaging the active area.

In addition, the electrostatic charge dispersing circuits remaining after the shorting bar is removed minimize damage to the LCD by an electrostatic discharge and manufacturing costs are decreased by attaching the expensive polarizers after visual tests.

In the drawings and specification, there have been disclosed typical preferred embodiments of the invention and, although specific terms are employed, they are used in a generic and descriptive sense only and not for purpose of limitation, the scope of the invention being set forth in the following claims.

What is claimed is:

1. A thin film transistor (TFT) array panel, comprising:
   a substrate divided into a display region and a peripheral region;
   a gate wiring pattern formed on the substrate and comprising a second electrode, wherein a first insulating film is formed on the gate wiring pattern;
   a data wiring pattern formed on the gate wiring pattern and comprising a first electrode,
   wherein a second insulating film is formed on the data wiring pattern,
   wherein a third electrode is formed on the second insulating film and electrically connected to the first electrode and overlapped the second electrode, and
   wherein the data wiring pattern comprises a first data line and a second data line; and
   a first electrostatic discharge protection circuit comprising:
      a first capacitor comprising the first electrode and the second electrode; and
      a first semiconductor pattern formed in the peripheral region, electrically coupled between the first data line and the first electrode, and laterally spaced apart from the gate wiring pattern.

2. The TFT array panel of claim 1, wherein the second insulating film has a contact hole exposing the first electrode, and the third electrode is connected to the first electrode through the contact hole.

3. A thin film transistor (TFT) array panel, comprising:
   a substrate divided into a display region and a peripheral region;
   a gate wiring pattern formed on the substrate;
   a data wiring pattern formed on the gate wiring pattern and comprising a first data line and a second data line; and
   a first electrostatic discharge protection circuit comprising:
      a first capacitor comprising a first electrode and a second electrode;
      a first semiconductor pattern formed in the peripheral region, electrically coupled between the first data line and the first electrode, and laterally spaced apart from the gate wiring pattern; and
      a second semiconductor pattern electrically coupled between the first electrode and the second data line neighboring the first data line.

4. The TFT array panel of claim 3, wherein the second electrode is floated.

5. The TFT array panel of claim 4, further comprising a second electrostatic discharge protection circuit comprising:
   a second capacitor comprising a third electrode and the second electrode; and
   the second semiconductor pattern electrically coupled between the third electrode and the second data line.

* * * * *